US012669656B2

(12) United States Patent　　(10) Patent No.:　US 12,669,656 B2
　　Cline et al.　　　　　　　　　　(45) Date of Patent:　　Jun. 30, 2026

(54) ARRAY AND DUPLEX POLARITY SCHEMES FOR OPTICAL LINKS USING MULTI-ROW OPTICAL CONNECTORS WITH SIGNAL INVERSION AND CROSSOVER

(71) Applicant: US Conec Ltd., Hickory, NC (US)

(72) Inventors: Jennifer Cline, Granite Falls, NC (US); Thomas Mitcheltree, Hickory, NC (US); Michael E. Hughes, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 413 days.

(21) Appl. No.: 18/508,965

(22) Filed: Nov. 14, 2023

(65) Prior Publication Data

US 2024/0085642 A1　　Mar. 14, 2024

Related U.S. Application Data

(63) Continuation-in-part of application No. 18/001,603, filed as application No. PCT/US2021/038191 on Jun. 21, 2021.

(Continued)

(51) Int. Cl.
　*G02B 6/38*　　　(2006.01)
　*G02B 6/40*　　　(2006.01)
(52) U.S. Cl.
　CPC ......... *G02B 6/3882* (2013.01); *G02B 6/3825* (2013.01); *G02B 6/3831* (2013.01); *G02B 6/403* (2013.01)

(58) Field of Classification Search
　CPC .. G02B 6/3882; G02B 6/3825; G02B 6/3831; G02B 6/4249; G02B 6/4292; G02B 6/3885; G02B 6/403; G02B 6/3893
　See application file for complete search history.

(56) References Cited

U.S. PATENT DOCUMENTS 4,178,068 A　　12/1979　Hoover
4,762,389 A　　　8/1988　Kaihara
(Continued)

FOREIGN PATENT DOCUMENTS

WO　　　　9957593 A1　　11/1999

OTHER PUBLICATIONS

International Search report and Written Opinion of the ISA, mailed Oct. 14, 2021 in PCT/US2021/038191, 12 pages.
(Continued)

*Primary Examiner* — Andrew Jordan
(74) *Attorney, Agent, or Firm* — Michael L. Leetzow PLLC

(57)　　　　　ABSTRACT
Fiber optic assemblies are used to link transceivers carrying a signal from the transmitter portion of one transceiver to the receiver portion of another transceiver. The fiber optic assemblies have multi-fiber fiber optic connectors with a multi-fiber ferrule with two rows of optical fibers and with a gender of either male or female. When the fiber optic connectors have fiber optic connectors with the same gender, the plurality of optical fibers are inverted and when the fiber optic assemblies have fiber optic connectors with an opposite gender, the plurality of optical fibers are not inverted but switch rows. The inversion may also occur when the fiber optic connectors have the opposite gender in an alternative embodiment.

17 Claims, 15 Drawing Sheets

Related U.S. Application Data

(60) Provisional application No. 63/041,302, filed on Jun. 19, 2020, provisional application No. 63/425,230, filed on Nov. 14, 2022.

(56) References Cited

U.S. PATENT DOCUMENTS

| | | | | |
|---|---|---|---|---|
| 4,767,430 | A * | 8/1988 | Deneka | G02B 6/262 |
| | | | | 65/412 |
| 5,016,970 | A | 5/1991 | Nagase et al. | |
| 5,076,656 | A * | 12/1991 | Briggs | G02B 6/3893 |
| | | | | 385/71 |
| 5,746,764 | A | 5/1998 | Green et al. | |
| 6,085,003 | A | 7/2000 | Knight | |
| 6,089,759 | A | 7/2000 | Kawamura et al. | |
| 6,106,162 | A | 8/2000 | Mrakovich et al. | |
| 6,154,597 | A | 11/2000 | Roth | |
| 6,195,477 | B1 | 2/2001 | Denuto et al. | |
| 6,343,950 | B1 * | 2/2002 | Eginton | H01R 13/516 |
| | | | | 439/157 |
| 6,357,933 | B1 | 3/2002 | Bradley et al. | |
| 6,402,388 | B1 | 6/2002 | Imazu et al. | |
| 6,409,392 | B1 * | 6/2002 | Lampert | G02B 6/3879 |
| | | | | 385/59 |
| 6,435,730 | B1 | 8/2002 | Kevern et al. | |
| 7,147,383 | B2 | 12/2006 | Sullivan | |
| 7,184,635 | B2 | 2/2007 | Livingston | |
| 7,186,035 | B2 * | 3/2007 | Dunn | G02B 6/421 |
| | | | | 385/55 |
| 8,009,959 | B2 * | 8/2011 | Barnes | G02B 6/0365 |
| | | | | 385/59 |
| 8,104,973 | B2 | 1/2012 | Howard et al. | |
| 8,251,591 | B2 * | 8/2012 | Barnes | G02B 6/3885 |
| | | | | 385/59 |
| 8,740,473 | B2 | 6/2014 | Katoh | |
| 9,097,874 | B2 * | 8/2015 | Coleman | G02B 6/4472 |
| 9,798,094 | B2 * | 10/2017 | Kuffel | G02B 6/3893 |
| 9,933,582 | B1 | 4/2018 | Lin | |
| 10,162,126 | B2 * | 12/2018 | Elenbaas | G02B 6/3874 |
| 10,191,227 | B2 | 1/2019 | Lee | |
| 10,371,903 | B1 * | 8/2019 | Nguyen | G02B 6/3873 |
| 10,451,830 | B2 | 10/2019 | Szumacher et al. | |
| 10,495,817 | B2 | 12/2019 | Gurreri | |
| 10,591,679 | B2 * | 3/2020 | Elenbaas | G02B 6/3882 |
| 10,782,474 | B2 | 9/2020 | Brusberg et al. | |
| 11,016,250 | B2 * | 5/2021 | Higley | G02B 6/3878 |
| 11,243,361 | B2 | 2/2022 | Masselin et al. | |
| 11,340,405 | B2 * | 5/2022 | Hendrick | G02B 6/406 |
| 11,353,664 | B1 | 6/2022 | Wong | |
| 11,422,312 | B2 * | 8/2022 | Gibbs | G02B 6/3869 |
| 11,428,875 | B2 * | 8/2022 | Nguyen | G02B 6/3825 |
| 11,493,701 | B2 * | 11/2022 | Kuffel | G02B 6/3831 |
| 11,693,191 | B2 * | 7/2023 | Lu | G02B 6/3893 |
| | | | | 385/81 |
| 11,719,893 | B2 | 8/2023 | Higley et al. | |
| 11,914,195 | B2 | 2/2024 | Higley et al. | |
| 11,940,657 | B2 * | 3/2024 | Nguyen | G02B 6/3825 |
| 12,019,278 | B2 | 6/2024 | Kurtz et al. | |
| 2002/0094174 | A1 | 7/2002 | Asada | |
| 2002/0114584 | A1 | 8/2002 | Dean et al. | |
| 2002/0131722 | A1 | 9/2002 | Lampert et al. | |
| 2003/0215190 | A1 | 11/2003 | Lampert et al. | |
| 2004/0005122 | A1 | 1/2004 | Ishii et al. | |
| 2004/0062486 | A1 | 4/2004 | Tanaka et al. | |
| 2005/0254756 | A1 * | 11/2005 | Dunn | G02B 6/421 |
| | | | | 385/88 |
| 2006/0051028 | A1 * | 3/2006 | Sasaki | G02B 6/3882 |
| | | | | 385/60 |
| 2006/0115217 | A1 * | 6/2006 | Childers | G02B 6/3885 |
| | | | | 385/53 |
| 2006/0245695 | A1 * | 11/2006 | Fujiwara | G02B 6/3885 |
| | | | | 385/71 |
| 2007/0297726 | A1 * | 12/2007 | Childers | G02B 6/3885 |
| | | | | 249/175 |
| 2010/0322554 | A1 * | 12/2010 | Barnes | G02B 6/44528 |
| | | | | 385/71 |
| 2010/0322562 | A1 * | 12/2010 | Barnes | G02B 6/3885 |
| | | | | 385/59 |
| 2011/0249943 | A1 * | 10/2011 | Case | G02B 6/3885 |
| | | | | 385/59 |
| 2012/0082416 | A1 * | 4/2012 | Katoh | G02B 6/3831 |
| | | | | 385/72 |
| 2012/0288233 | A1 * | 11/2012 | Barnes | G02B 6/3895 |
| | | | | 385/59 |
| 2013/0136401 | A1 | 5/2013 | Cooke et al. | |
| 2014/0153875 | A1 | 6/2014 | Bradley et al. | |
| 2014/0219609 | A1 | 8/2014 | Nielson et al. | |
| 2014/0341509 | A1 * | 11/2014 | Coleman | G02B 6/4472 |
| | | | | 385/54 |
| 2015/0331202 | A1 | 11/2015 | Rosson | |
| 2016/0131855 | A1 * | 5/2016 | Barnes, Jr. | G02B 6/3885 |
| | | | | 385/59 |
| 2017/0176691 | A1 | 6/2017 | Childers et al. | |
| 2017/0199339 | A1 * | 7/2017 | Kuffel | G02B 6/3893 |
| 2017/0293088 | A1 | 10/2017 | Manes et al. | |
| 2017/0363816 | A1 * | 12/2017 | Elenbaas | G02B 6/3882 |
| 2018/0335576 | A1 | 11/2018 | Färbert et al. | |
| 2019/0146161 | A1 * | 5/2019 | Elenbaas | G02B 6/3885 |
| | | | | 385/59 |
| 2019/0339458 | A1 | 11/2019 | Pimpinella | |
| 2019/0346633 | A1 | 11/2019 | Cloud et al. | |
| 2020/0284998 | A1 * | 9/2020 | Higley | G02B 6/3857 |
| 2020/0355872 | A1 * | 11/2020 | Gibbs | G02B 6/3869 |
| 2021/0080655 | A1 * | 3/2021 | Hendrick | G02B 6/3822 |
| 2021/0149124 | A1 | 5/2021 | Higley et al. | |
| 2021/0263235 | A1 * | 8/2021 | Kuffel | G02B 6/3898 |
| 2021/0333483 | A1 | 10/2021 | Morishima | |
| 2021/0376518 | A1 * | 12/2021 | De Bolle | H01R 13/6271 |
| 2022/0107467 | A1 | 4/2022 | Higley et al. | |
| 2022/0342162 | A1 * | 10/2022 | Hughes | G02B 6/4286 |
| 2022/0365292 | A1 * | 11/2022 | Hendrick | G02B 6/3831 |
| 2023/0061756 | A1 | 3/2023 | Nhep et al. | |
| 2023/0091327 | A1 | 3/2023 | Kurtz et al. | |
| 2023/0096618 | A1 * | 3/2023 | Childers | G02B 6/3857 |
| | | | | 385/134 |
| 2023/0228949 | A1 | 7/2023 | Childers et al. | |
| 2023/0288650 | A1 * | 9/2023 | Childers | G02B 6/3898 |
| 2024/0085636 | A1 * | 3/2024 | Higley | G02B 6/3885 |
| 2024/0085642 | A1 * | 3/2024 | Cline | G02B 6/3825 |

OTHER PUBLICATIONS

TIA-568.3-D standard pp. 10-12, Sections reproduced under written permission from Telecommunications Industry Association, Oct. 25, 2016.

* cited by examiner

450

ARRAY AND DUPLEX POLARITY SCHEMES FOR OPTICAL LINKS USING MULTI-ROW OPTICAL CONNECTORS WITH SIGNAL INVERSION AND CROSSOVER

REFERENCE TO RELATED CASE

This application is a continuation-in-part of U.S. patent application Ser. No. 18/001,603, filed on Dec. 13, 2022 and claims priority under 35 U.S.C. § 119 (e) to U.S. provisional application No. 63/425,230 filed on Nov. 14, 2022, the contents of which are hereby incorporated by reference in their entirety.

BACKGROUND OF THE INVENTION

Optical fibers in many data communication applications are routed between a transmitter-receiver pair. Typically, a transmitter (e.g., a laser or LED source) is co-located with a receiver (e.g., a photodiode) and this pair is jointly referred to as a transceiver. A transceiver on one side of an optical link is typically connected to another transceiver at a different point in the optical link. A working optical link has each transmitter (in a first transceiver) connected to a corresponding receiver (in a second transceiver) by optical fibers. The optical link will fail if the transmitter is accidentally or erroneously connected by the optical fibers to another transmitter (instead of to the receiver). Accordingly, it is important that a correct polarity (i.e., a transmitter connected to a receiver) is maintained between any two connection points in the optical link. These connection points may be two opposite end transceivers, or multiple transceivers (two or more) or transceivers with intermediary adapters. If there are multiple intermediary transceivers or connection points, then correct polarity has to be ensured throughout the optical link in that case as well.

Typically, fiber optic connectors are used to connect two or more optical fibers. When multi-fiber connectors (e.g., those having MT-ferrules) are utilized, tracking and maintaining polarity between two connection points is even more challenging. Certain industry standards such as the TIA-568 standard provides guidelines regarding polarity features and orientation of these connectors to ensure that a correct order of fibers is presented at every connection point to ensure that correct polarity is maintained. However, these connection schemes require extensive book-keeping at each connection point in the optical link by system implementers to make sure that the optical fiber(s) carrying a signal from the transmitter connects correctly to a receiver only. Further, certain conventional systems require that physical polarity features of a ferrule, or the connector housing, or both, be present and maintained in a particular relative orientation to ensure correct polarity. This is coupled with polarity features on adapters ("key-up to key-up" or "key-up to key-down"), which further complicates the setup. The challenge to ensure correct polarity is exacerbated when angle-polished ferrules are present, for example, in single mode fiber applications, further adding to the complexity in tracking polarity in optical fiber links since the ferrules can only be mated in one way. U.S. Pat. Nos. 7,184,635 and 7,147,383 provide examples of two conventional schemes for optical polarity.

For MPO type connectors, polarity errors may occur during assembly at the factory. Correct MPO polarity requires an end user to use the correct adapter for a given fiber optic assembly as well as requires the correct fiber optic assembly to be purchased by the end user. Further, in certain situations, the installer installing the MPO connectors into the adapters needs to verify the correct fiber optic assembly orientation with respect to the adapters. MPO polarity methods include both types of polarity cables (key-up to key-down, and key-up to key-up) in all gender and polish angle combinations (20 cable variants) with both adapter variants. These steps increase complexity, create end user confusion, and increase chances for error.

Finally, yet another layer of complexity is added if the optical link designer desires to have a multi-row ferrule, in which case, book-keeping of polarity and signal transmission and reception lines would need to be tracked for two or more rows of optical fibers inside between mating ferrules instead of only one row of optical fibers.

Thus, there is a need for a method and system solution for addressing the problem of ensuring the correct polarity within an optical link, without having to resort to the aforementioned variations in connector and adapter assembly configurations and associated book-keeping complexities thereof.

SUMMARY OF THE INVENTION

According to one aspect, the present invention is directed to a for ensuring correct polarity in an optical link having a first transceiver and a second transceiver separated from one another that includes providing a first multi-fiber ferrule with two rows of optical fibers and guide pins and supporting the optical fibers carrying optical signals passing through the first transceiver and a second multi-fiber ferrule with two rows of optical fibers and with guide pins and supporting the optical fibers carrying optical signals passing through the second transceiver, and providing at least one female-to-female jumper assembly having two female connectors couplable respectively to the first multi-fiber ferrule associated with the first transceiver and the second multi-fiber ferrule associated with the second transceiver, the at least one female-to-female jumper assembly having a first plurality of optical fibers extending between the two female connectors, wherein said at least one female-to-female jumper assembly includes an inversion in an order of the first plurality of optical fibers connecting the two female connectors, and wherein when the optical link further includes using at least one male-to-female extender assembly having a male connector on a first end of the at least one male-to-female extender assembly and a female connector on a second end of the at least one male-to-female extender assembly between said first and second transceivers, the male connector and the female connector of the at least one male-to-female extender assembly joined to each other by a second plurality of optical fibers, a first group of optical fibers in the second plurality of optical fibers and supported in a first row of a multi-fiber ferrule in the male connector cross-over to a second row of a multi-fiber ferrule in the female connector, and a second group of optical fibers in the second plurality of optical fibers and supported in a second row of the multi-fiber ferrule of the male connector cross-over to a first row of the multi-fiber ferrule of the female connector such that between the male connector and the female connector, each of the two rows are switched to the other of the two rows in the male-to-female extender assembly, and the number of inversions of optical fibers between the two adapters is an odd number.

In some embodiments, the optical link further includes a trunk assembly having two male connectors, one of the two male connectors on opposing ends of a plurality of optical fibers mating with one of the two female connectors of the female-to-female jumper and includes an inversion in an order of the plurality of optical fibers connecting the two female connectors of the at least one male-to-female extender assembly.

In some embodiments, it further includes a first adapter associated with the first transceiver, a second adapter associated with the second transceiver; and a first key on the first adapter and a second key on the second adapter, the first key and the second key aligned to a key on one of the two female connectors of the at least one female-to-female jumper assembly that directly mates in the adapter.

In some embodiments, the optical link includes at least one male-to-male trunk assembly, the at least one male-to-male trunk assembly does not mate directly with either the first multi-fiber ferrule or the second multi-fiber ferrule.

In some embodiments, there is an additional male-to-female extender assembly having exactly one male connector and one female connector, the one female connector of the additional male-to-female extender assembly being coupled to at least one of the first multi-fiber ferrule of the first transceiver and the second multi-fiber ferrule of the second transceiver, or the one male connector of the additional male-to-female extender assembly being coupled to one of the at least two female connectors of the at least one female-to-female jumper assembly.

In some embodiments, the first and the second multi-fiber ferrules have a non-perpendicular angled end face relative to a direction of optical beam propagation inside the first and the second multi-fiber ferrule, and wherein each ferrule of the at least one female-to-female jumper assembly and the male-to-female extender assembly also has an angled end face relative to a respective direction of respective optical beam propagation therein.

In yet another aspect, there is a method for ensuring correct polarity in an optical link having a first transceiver and a second transceiver that includes providing a first multi-fiber ferrule with two rows of optical fibers, guide pins, and supporting optical fibers carrying optical signals passing through the first transceiver, and a second multi-fiber ferrule with two rows of optical fibers, guide pins, and supporting optical fibers carrying optical signals passing through the second transceiver, and providing only three configurations of connector assemblies to maintain correct routing of optical signals between the first transceiver and the second transceiver, the three configurations of connector assemblies including: a jumper assembly having two female connectors on opposing ends of a first plurality of optical fibers, a trunk assembly having two male connectors on opposing ends of a second plurality of optical fibers, and an extender assembly having exactly one male connector and one female connector on opposing ends of a third plurality of optical fibers, wherein routing of the optical signals is carried out using at least one jumper assembly couplable to the first multi-fiber ferrule of the first transceiver and the second multi-fiber ferrule of the second transceiver, the at least one jumper assembly including an inversion in an order of the plurality of optical fibers for each row of the first plurality of optical fibers connected between the two female connectors of the at least one jumper assembly, wherein when the optical link includes at least one extender assembly, the optical fibers in a first row of a multi-fiber ferrule in the male connector cross-over to a second row of a multi-fiber ferrule in the female connector, and the optical fibers of a second row of the multi-fiber ferrule of the male connector cross-over to a first row of the multi-fiber ferrule of the female connector such that each of the two rows are switched to the other of the two rows in the extender assembly and wherein total number of inversions in optical fibers between the two adapters is odd, wherein when the extender assembly is used in addition to the jumper assembly and/or the trunk assembly.

In some embodiments, the optical link includes the at least one female-to-female jumper assembly and at least one male-to-female extender assembly, the at least one male-to-female extender assembly does not mate directly with either the first ferrule or the second ferrule.

In some embodiments, there is an extender assembly having exactly one male connector and one female connector, the extender assembly being coupled to at least one of the first ferrule or the second ferrule.

In yet another aspect, there is an optical system that includes first adapter communicatively associated with a first transceiver, a second adapter communicatively associated with a second transceiver, the first transceiver and the second transceiver being physically separated and optically coupled, a first multi-fiber ferrule with guide pins and two rows of optical fibers inside the first adapter, the optical fibers carrying optical signals passing through the first transceiver, a second multi-fiber ferrule with guide pins and two rows of optical fibers inside the second adapter and carrying optical signals passing through the second transceiver, and at least one female-to-female jumper assembly having two female connectors and each of the two female connectors having respective multi-fiber ferrules capable of holding two rows of optical fibers, one of the two female connectors positioned at opposing ends of a plurality of optical fibers, a first of the two female connectors coupling to a first multi-fiber ferrule thereof, and a second of the two female connectors coupling to a second multi-fiber ferrule thereof, wherein said at least one female-to-female jumper assembly includes an inversion in an order of each row of optical fibers connecting the two female connectors, wherein the first transceiver and the second transceiver and the at least one jumper assembly form an optical link, and wherein when the optical link further includes at least one male-to-female extender assembly having a male connector on a first end of the at least one male-to-female extender assembly and a female connector on a second end of the at least one male-to-female extender assembly between said first and second transceivers, optical fibers in a first row of a multi-fiber ferrule in the male connector cross-over to a second row of a multi-fiber ferrule in the female connector, and the optical fibers of a second row of the multi-fiber ferrule of the male connector cross-over to a first row of the multi-fiber ferrule of the female connector such that each of the two rows are switched to the other of the two rows in the at least one male-to-female extender assembly, and a total number of inversions of optical fibers between the first adapter and the second adapter is odd According to yet another aspect, there is an optical system that includes a first adapter communicatively associated with a first transceiver, a second adapter communicatively associated with a second transceiver, the first and the second transceivers being optically coupled, a plurality of fiber optic assemblies, each of the plurality of optical fibers having opposing ends, the opposing ends being terminated by a first fiber optic connector and a second fiber optic connector and each of the fiber optic connectors have a two row multi-fiber ferrule disposed therein, the fiber optic connectors having a gender of either male or female, and wherein when fiber optic connectors assemblies have fiber optic connectors with the same gender, the plurality of optical fibers are inverted between respective two-row multi-fiber ferrules of the fiber optic connectors and when the fiber optic connectors assemblies have fiber optic connectors with opposite genders, the optical fibers in a first row of the multi-fiber ferrule in the male connector cross-over to a second row of a multi-fiber ferrule in the female connector, and the optical fibers of a second row of the multi-fiber ferrule of the male connector cross-over to a first row of the multi-fiber ferrule of the female connector such that each of the two rows are switched to the other of the two rows in the fiber optic assemblies having fiber optic connectors with the opposite genders.

According to some embodiments, the two row multi-fiber ferrule in each of the fiber optic connectors has dimensions of 1.9 mm height, 4.1 mm length between a front end and a rear end thereof, and a width of 6.4 mm between a first side portion and a second side portion thereof.

According to some embodiments, the two row multifiber ferrule in each of the fiber optic connectors is a TMT ferrule.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
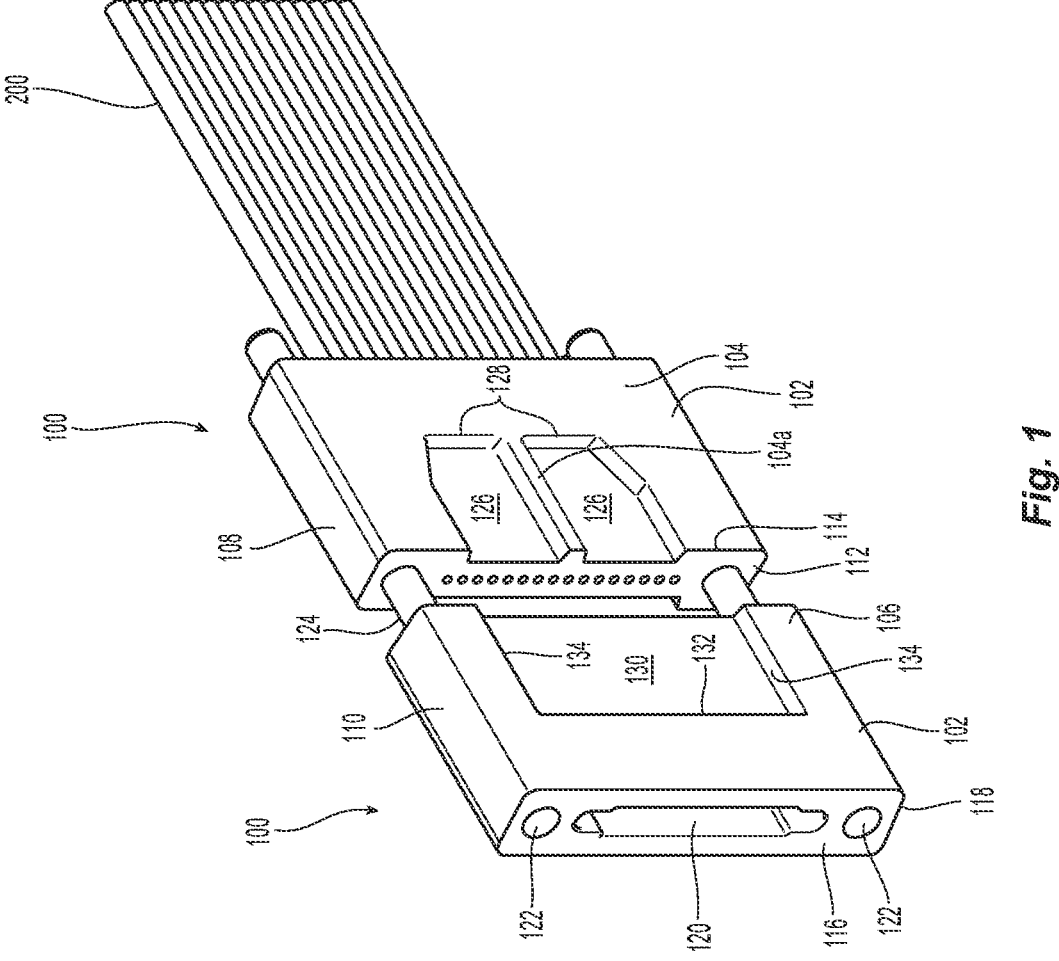
FIG. 1 is a perspective view of one embodiment of two fiber optic ferrules in a partially mated condition that are disposed within a fiber optic connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Illustrated in FIG. 1 are two multi-fiber ferrules 100 according to the present invention. Both of the multi-fiber ferrules 100 are the same, so the discussion of one applies equally to the other. The multi-fiber ferrule 100 has a main body 102 having a top portion 104 and a bottom portion 106. There is a first side portion 108 that extends between the top portion 104 and the bottom portion 106. There is also a second side portion 110 extending between the top portion 104 and the bottom portion 106 on opposites sides of the main body 102. The main body 102 also has an end face 112 at a front end 114 of the main body 102 and a rear face 116 at a rear end 118 of the main body 102. The multi-fiber ferrule 100 is significantly smaller than the conventional MT—ferrule and has typical dimensions of 1.25 mm height, 4 mm length (between the front end 114 and the rear end 118), and a width of 6.4 mm between the first side portion 108 and the second side portion 110.

The multi-fiber ferrule 100 has a rear central opening 120 extending into the main body 102 from the rear face 116 and configured to receive at least three optical fibers 200. The optical fibers 200 may be single mode or multi-mode, and may be single core or multi-core, or combinations thereof. Further, this disclosure is not limited by the size or diameter of the optical fibers 200. The multi-fiber ferrule 100 also has a plurality of fiber support structures to support the optical fibers (not shown). The fiber support structures are in communication with the rear central opening 120 and extending through the main body 102 to the end face 112. The main body 102 may also include two guide pin holes 122, which extend between the end face 112 and the rear face 116. The guide pin holes 122 provide a reference point with respect to the main body 102 and other structures to which the multi-fiber ferrule 100 is mated. As noted below, the guide pin holes 122 are outside the area of cutouts 126,130 to allow for enough material in the main body 102 to allow for the guide pin holes 122. The end face 112 may have a rectangular profile, although a trapezoidal profile (as shown) may also be provided as an alternative. There may be guide pins 124 that are disposed within the guide pin holes 122.

The top portion 104 has top cut-outs 126 that form first forward facing surfaces 128. The two top cut-outs 126 are separated by a continuation 104a of the top portion 104. The continuation 104a of the top portion 104 acts as a key for the multi-fiber ferrule 100. Alternatively, the continuation 104a may not be present, or may only be present partly extending rearward from the front end 114 and not forming a full partition between the two portions of the cutout 126.

The first forward facing surface 128 is used as a stop surface in conjunction with a housing for a connector, e.g., an SFP/QSFP footprint connector format. There may also be a number of other surfaces formed by the top cut-out 126. As illustrated in the figures, the top cut-outs 126 do not extend all of the way to the rear end 118, but stop short at the first forward facing surface 128. However, a portion of the top cut-out 126 could extend all the way to the back of the multi-fiber ferrule 100.

Similarly, the bottom portion 106 has the bottom cut-out 130 that forms a second forward facing surface 132. The second forward facing surface 132 is also used as a stop surface in conjunction with a housing for a connector. The bottom cut-out 130 also has two laterally facing surfaces 134 that form a portion thereof. The bottom cut-out 130 extends from the end face 112 towards the rear end 118, but does not reach the rear end 118. It may reach the same distance toward the rear end 118 from the end face 112 as does the top cut-out 126, but it may stop short of or beyond where the top cut-out 126 stops at forward facing surface 128. The cutouts 126,130 are dimensioned differently to allow for proper orientation of the mating multi-fiber ferrules 100, especially for angle-polished end faces 112, as further discussed below.

It should be noted that the thickness of the main body 102 varies across a width and a depth. The thickness of the main body 102 is least where the two cut-outs 126, 130 are located (i.e., having the least amount of multi-fiber ferrule 100 material). The thickness of the main body 102 is greatest where there are no cut-outs (i.e., having the most amount of multi-fiber ferrule 100 material).

Returning to the main body 102, there is no shoulder with multi-fiber ferrule 100 making the profile from the back to the front the same as the front to the back—and also the same at the end face 112 and the rear face 116. That is, the multi-fiber ferrule 100 is shoulder-less. There are also preferably no sharp edges along the length of the multi-fiber ferrule 100 at the junction of the side portions 108,110 to the top and bottom portions 104,106. It should also be noted that the top portion 104 may be wider than the bottom portion. That is, the distance across the top portion 104 may be greater than the distance across the bottom portion 106 between the side portions, in which case the end face 112 will have a trapezoidal profile.

The end face 112 is preferably angle-polished, i.e., at a non-perpendicular angle relative to the rear face 116, and/or relative to the direction of propagation of the optical beam inside the optical fibers 100 in the multi-fiber ferrule 100. The end face 112 is angled at about 8° to a direction of propagation of the optical beam inside the optical fiber 200 held by the multi-fiber ferrule 100. However, other ranges may be utilized, such as 5°-15° or 4°-10°. Alternatively, the end-face 112 may be flat polished (i.e., perpendicular to the rear face 116 and to the beam propagation direction). The top cut-out 126 may have a different width than the bottom cut-out 130. This may also act as a polarity indication and/or may cause the ferrule 100 to be oriented in a specific direction when received inside a receptacle or an adapter for mating with another ferrule. Such different dimensions of the cutout 126 to the cutout 130 may render the continuation 104a redundant and unnecessary in some embodiments, and accordingly the continuation 104a may be eliminated. Alternatively, the top cut-out 126 may have a same width as the bottom cut-out 130.

Figure 2:
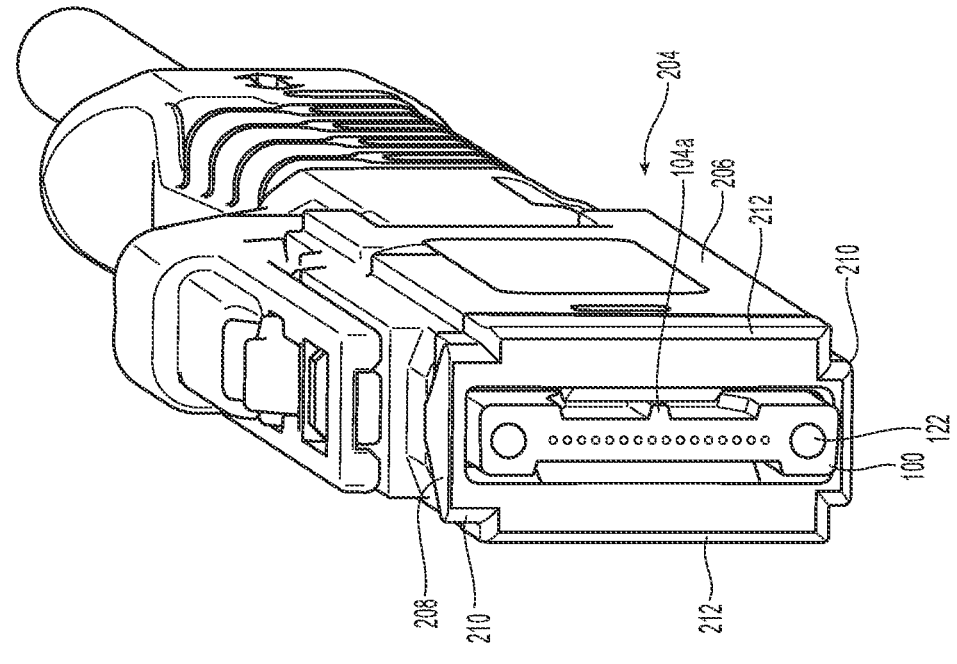
FIG. 2 is a front perspective view of two fiber optic connectors with one of the fiber optic ferrules of FIG. 1, one having a male configuration and one having a female configuration.
Figure 2:
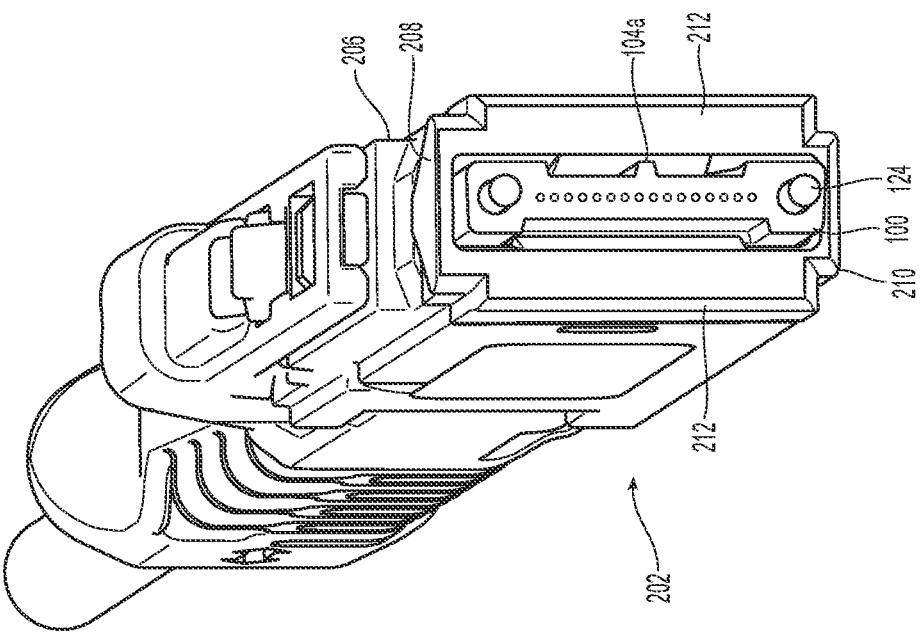

FIG. 2 illustrates two fiber optic connectors 202 and 204 that each includes a multi-fiber ferrule 100. The fiber optic ferrule 202 has guide pins 124 that are disposed within the guide pin holes 122. Thus, this fiber optic ferrule 202 has a male configuration. The fiber optic ferrule 204 does not have guide pins and therefore has a female configuration. The fiber optic connectors 202 and 204 are preferably the same and have the same components except for the guide pins 124. Thus, they will have an outer housing 206, which also has a key feature 208. The housing 206 has two short sides 210 and two long sides 212. The key feature 208 is preferably on one of the short sides 210, but could also be disposed on one of the long side 212. There are other internal components that are known to one of ordinary skill in the art and will not be discussed herein. However, one embodiment is discussed in PCT/US2021/028925, filed by the same applicant.

It should be noted that the multi-fiber ferrules 100 are installed in the outer housing 206 in the same orientation. The multi-fiber ferrules 100 may each protrude slightly from the front opening of the housing 206, as shown in FIG. 2, for example. That is the continuation 104a of the top portion 104 that acts as a key is in the same relationship to the keying feature 208 on the fiber optic connector 202,204. This means that the optical fibers 200 in each fiber optic connector 202,204 always have the same orientation with respect to both the outer housing 206 and the multi-fiber ferrules 100. Thus, even rotating the outer housing 206 and the multi-fiber ferrules 100 keeps the fiber order the same as before rotation. As noted below, the only difference in the fiber optic connectors 202,204 is the presence or absence of the guide pins 124 and whether the optical fibers 200 are inverted (flipped) with respect to the multi-fiber ferrules 100. In addition, the continuation 104a may be absent, in which case, the end face 112 has the same relative positioning to the keying feature 208 and/or the housing 206, in general. That is, the multi-fiber ferrule 100 has a fixed orientation relative to the outer housing 206 at all times regardless of the type of fiber optic assembly that it is a part of.

In FIGS. 3-6 there are representations of a transceiver 220 with a fiber optic connector 222 and an adapter 224. The fiber optic connector 222 associated with the transceiver 220 is preferably configured to have the male configuration (with guide pins 124). This male configuration setup of the fiber optic connector 222 is fixed inside the adapter 224, thereby eliminating another variable affecting polarity decisions in an optical link. Further, with the guide pins 124 already installed in the fiber optic connector 222, there are fewer pin stubbing issues with the mating of the fiber optic connectors 202,204 with the fiber optic connector 222. The fiber optic connectors 202,204 are to be connected to other fiber optic connectors 202,204 and to the fiber optic connector 222 through the adapter 224 associated with the transceiver 220. In the present invention, it is preferred that the transceiver signals are always in a fixed location with respect to the order of the optical fibers in the fiber optic connector 222. Generally, the transmitter side optical fibers 200 are towards a top side of the multi-fiber ferrules 100 in the fiber optic connector 222, e.g., fibers 1-8, and the receiver side fibers 200 are towards a bottom side of the multi-fiber ferrules 100, e.g., fibers 9-16 for a 16-fiber ferrule. This matches up with the type of adapter 224 used for interfacing to the transceiver signals immediately as they exit or enter the transceiver 220 module. That is, the adapter 224 at the transceiver 220 is the same for all transceivers in the optical link. The adapter interface 224 is shaped to accept a corresponding outer connector housing 206 in a key-up to key-up manner only. See FIG. 3 where the keying feature 208 is up. This allows for the system to always have the same adapter configuration, just as the system has the same configuration of the multi-fiber ferrules 100 (except for the guide pins as noted above). Alternatively, the system could be altered to always be in a key-down to key-down configuration.

Figure 3:
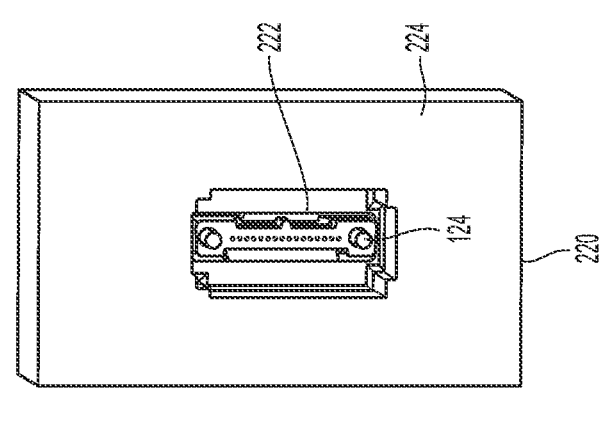
FIG. 3 is a perspective view of one embodiment of an optical link using one fiber optic assembly according to the present invention, the fiber optic assembly having two fiber optic connectors of FIG. 2 with the optical fibers inverted between the fiber optic connectors and schematic representations of transceivers having male-configured fiber optic connectors and adapters to receive a female configured fiber optic connector.
Figure 3:
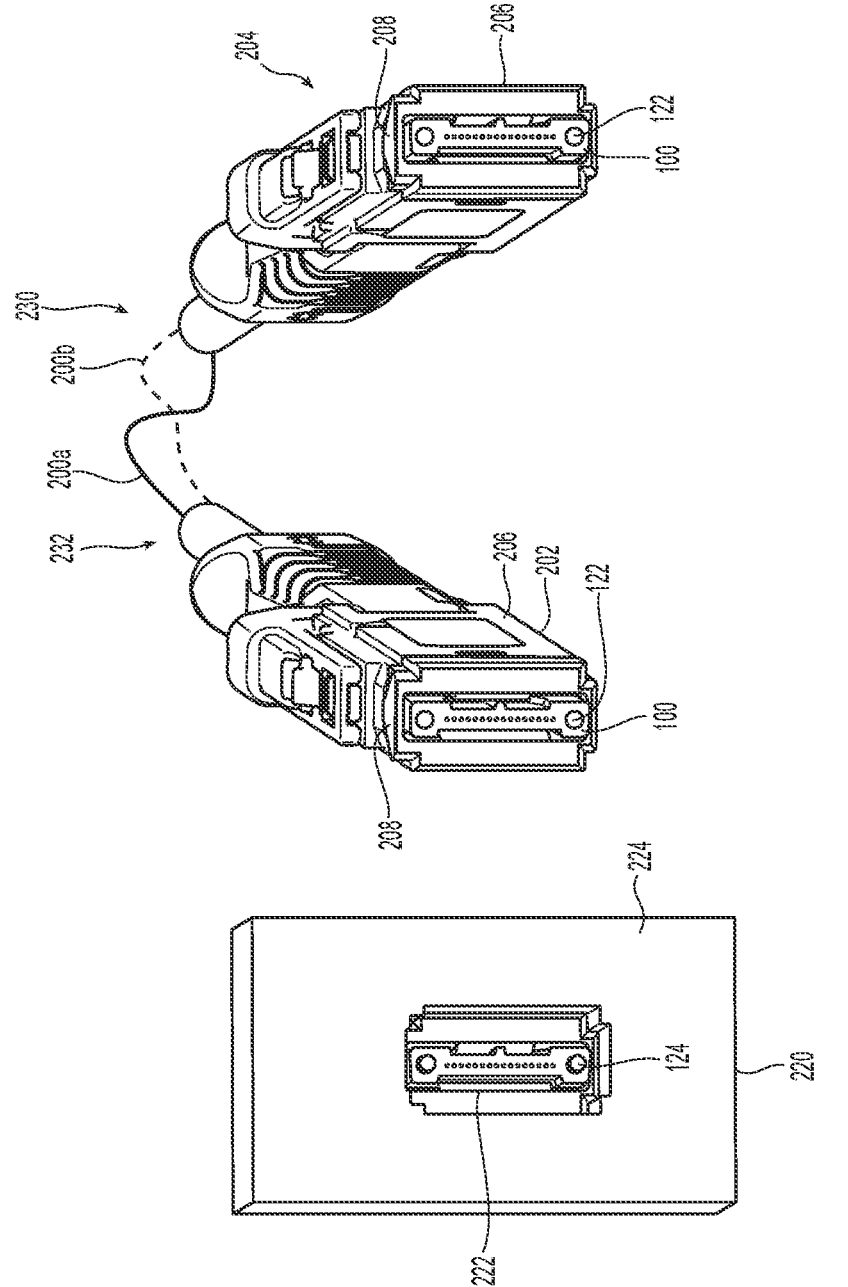

Further with regard to FIG. 3, there is illustrated a fiber optic assembly 230. Generally, a fiber optic assembly 230 has two fiber optic connectors (e.g., fiber optic connectors 202,204) with the multi-fiber ferrules 100 and optically connected by optical fibers 200. The present invention has exactly three types of these fiber optic assemblies 230 to eliminate the complexities associated with polarity decisions in such optical links (as opposed to up to 20 variations possible in conventional links). First, illustrated in FIG. 3 is a jumper assembly 232 (female-to-female jumper assembly) that has two fiber optic connectors 204 with a female configuration. It also has the optical fibers 200 inverted as illustrated by the solid line and the broken line (the first and the sixteenth optical fibers are shown with the other 14 removed for clarity). Thus, the optical fiber 200a on the top in the left fiber optic connector 202 is routed to the bottom in the right fiber optic connector 202, and the optical fiber 200b on the bottom in the left fiber optic connector 202 is routed to the top in the right fiber optic connector 202. Naturally, all of the optical fibers 200 are thus routed (optical fiber in place 15 is routed to place 2, etc.) Thus, the order of fibers between the left and right connectors 202,204 in the jumper assembly 232 is inverted or flipped. One of ordinary skill in the art after reading this disclosure will appreciate that if such a flip were not present in FIG. 3, it would lead to an inoperable optical link between the two transceivers 220 since the transmitter portion from one would go to the transmitter portion of the other (and same for the receiver portion).

The present invention also uses a fiber optic assembly 230 that has two male configured fiber optic connectors and is referred to herein as a trunk assembly (male-to-male trunk assembly) 234. It is the same as jumper assembly 232 but with guide pins 124 in the multi-fiber ferrule 100. See, e.g., the fiber optic assembly 230 in FIG. 4 at the top row in the middle (guide pins 124 are present in both connectors 202). As with the jumper assembly 232, the trunk assembly 234 also has the optical fibers 200 inverted (flipped) as illustrated by the solid line and the broken line. The trunk assembly 230 is the second type of fiber optic assembly 230 in accordance with this disclosure.

Finally, the present invention also uses a fiber optic assembly 230 that has one female-configured fiber optic connector 204 and one male-configured fiber optic connector 202 and is referred to herein as a extender assembly (male-to-female trunk assembly) 236. See, e.g., the fiber optic assembly 230 in FIG. 4 at the second and third positions in the middle row viewing from the left to the right of the figure. As the term "extender" suggests, the extender assembly 236 simply extends or continues the polarity order of fibers between any two points in the optical link. That is, in this extender assembly 236, the optical fibers are not inverted (flipped) but pass light directly through.

There needs to be at least one inversion (or flipping) in the order of the optical fibers in the overall optical link in order for the signals to be properly transmitted between the transceivers 220 through the optical fibers 200 in the fiber optic assemblies 230. This is because with the transceivers 220 always having the transmission portion on top and the receiving portion on the bottom of the connectors 222, the optical fibers 200 need to be inverted to allow the signals from the upper transmission portion in one transceiver 220 to be received by the lower receiving portion of another transceiver 220. As will be understood, since there needs to be one inversion to have a correct optical connection, there could be any number of inversions, as long as that number is odd (i.e., 1, 3, 5, 7, etc.). If it were to be an even number of fiber order inversions (and a pass through of the signals), then the transmission portions of the two transceivers 220 would be trying to communicate with each other, causing the optical link to fail.

Figure 4:
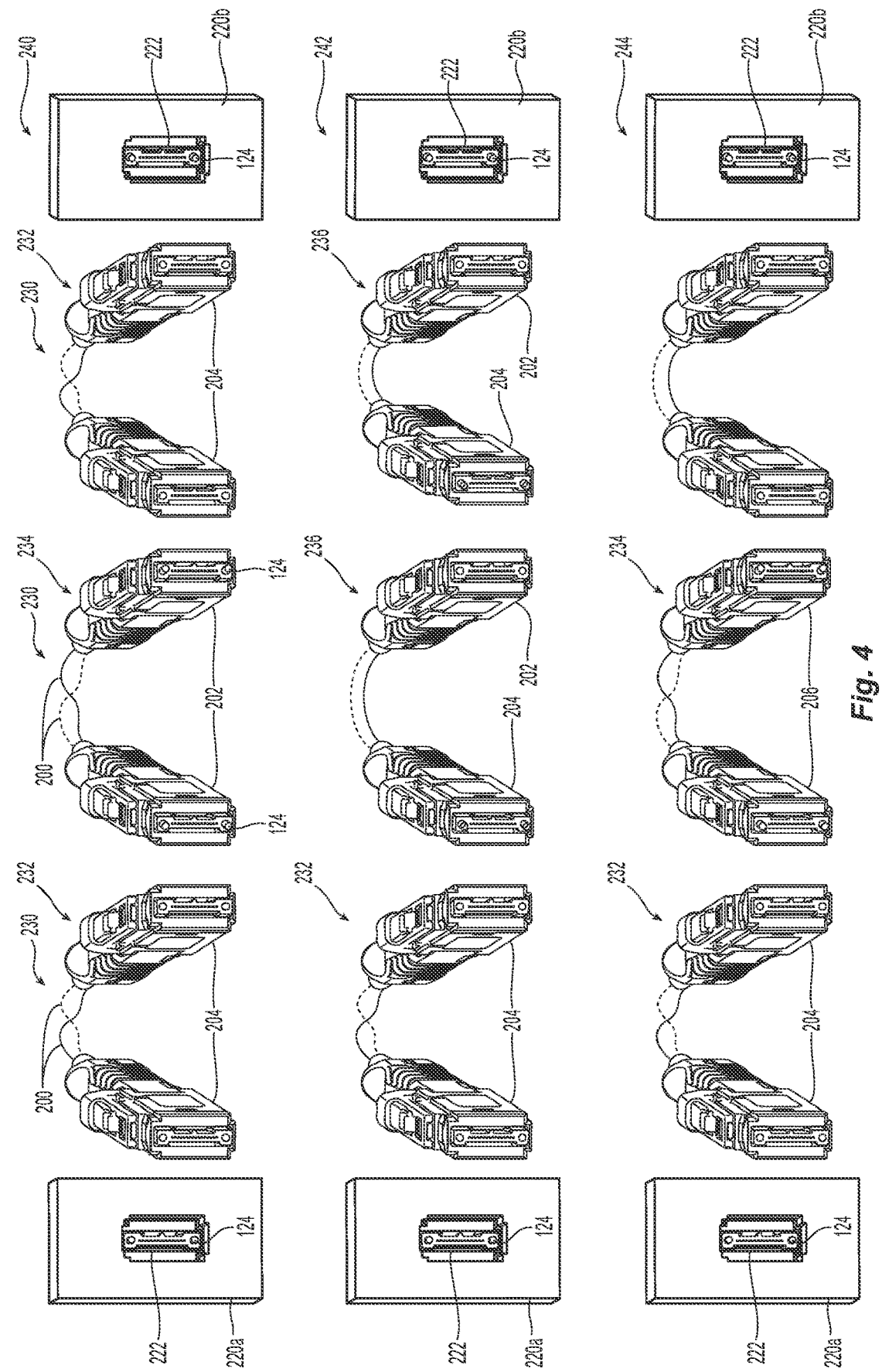
FIG. 4 illustrates three optical links and the methods of connecting two transceivers—one with three fiber optic assemblies with inverted optical fibers; one with two fiber optic assemblies without inverted optical fibers and one fiber optic assembly with inverted optical fibers; one with two fiber optic assemblies inverted optical fibers and one fiber optic assembly without inverted optical fibers that is inoperable.

Using these components, an optical link can be constructed with fewer components and information than with the prior art systems. Three such examples of optical links 240, 242 and 244 are illustrated in FIG. 4. The first optical link 240 has a first transceiver 220a and a second transceiver 220b. Disposed between these two transceivers 220a, 220b are three fiber optic assemblies 230—two jumper assembles 232 that would be attached to the transceivers 220a, 220b by way of the female-configured fiber optic connectors 204 with a trunk assembly 234 connected therebetween. The (female-to-female) jumper assemblies 232 are connected to the male-configured fiber optic connectors 222 in the transceivers 220 and then the trunk assembly (male-to-male trunk assembly) 234 is used to connect the two jumper assembles 232 to one another. In this optical link 240 there are three inversions in the order of the optical fibers, one for each of the fiber optic assemblies 230 that are positioned between the two transceivers 220.

The second optical link 242 also has a first transceiver 220a and a second transceiver 220b. Disposed between these two transceivers 220a,220b are three fiber optic assemblies 230—one jumper assembly 232 and two extender assemblies 236. Since the extender assemblies 236 have one male and one female connector, they can connect the jumper assembly 232 to the second transceiver 220b, the first transceiver 220a connecting to the jumper assembly 232 directly. Again, in this optical link, there is one inversion of the optical fibers—in the jumper assembly 232, and no inversion for the extender assemblies 236. Thus, an odd number of inversions of fibers exist in this optical link.

The third optical link 244 is one that is inoperable as it has two inversions, an even number and not an odd number. The optical link 244 has one jumper assembly 232 connected to a trunk assembly (male-to-male trunk assembly) 234. The second transceiver 220b is connected to a pass through fiber optic assembly 230 that has no fiber order inversions, providing two total inversions from the jumper assembly 232 and the trunk assembly 234. This configuration will not work since the inversion in the jumper assembly 232 is undone by the inversion in the trunk assembly 234 (leading to the transmitter of one transceiver 220 being connected with the transmitter of the other transceiver 220).

Figure 5:
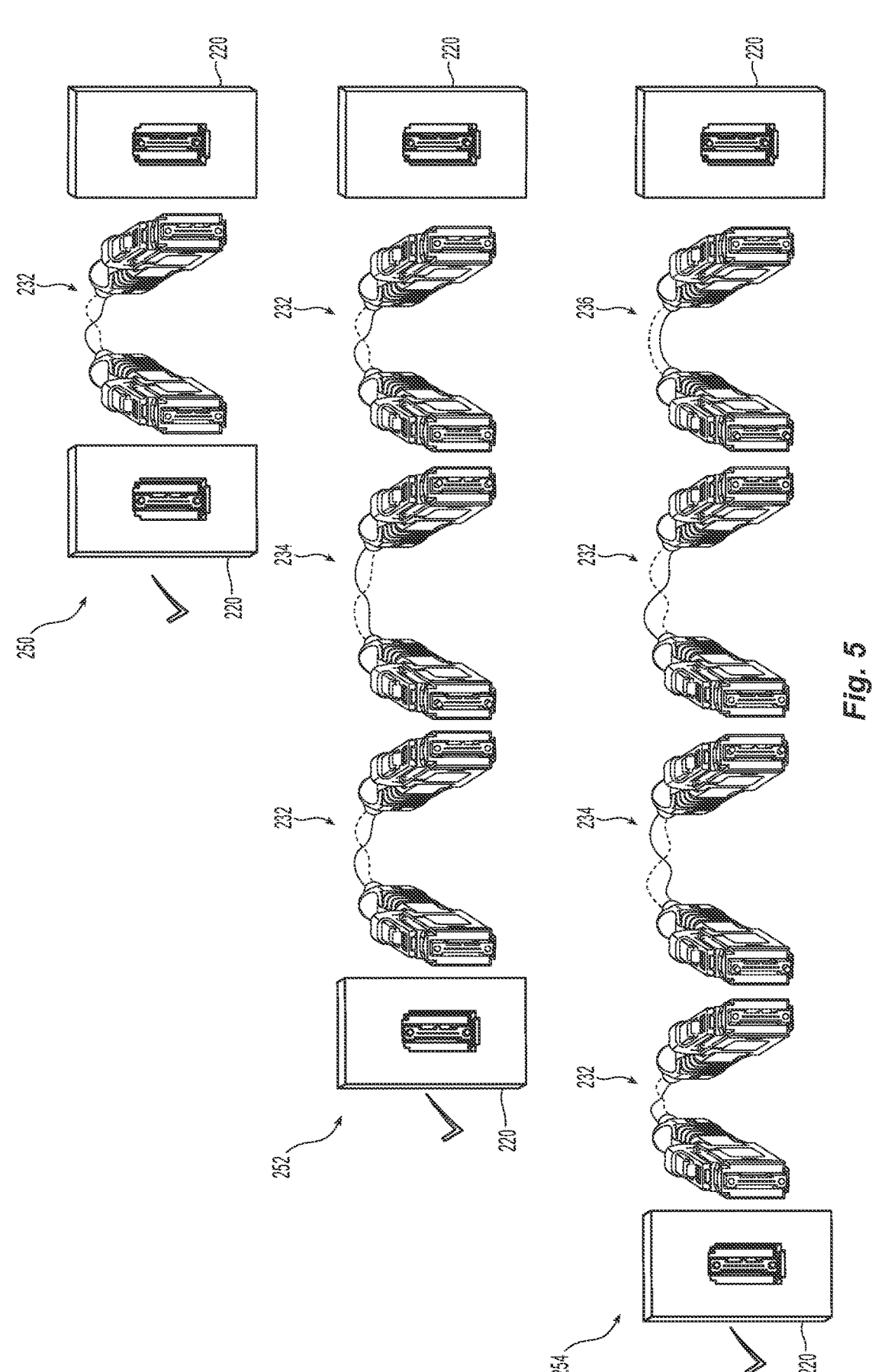
FIG. 5 illustrates three optical links and methods of connecting two transceivers that are operable, each having an odd number of fiber optic assemblies with inverted optical fibers.

FIG. 5 illustrates three more optical links 250, 252, and 254. As with the optical links in FIG. 4, there are two transceivers 220 to be connected. In optical link 250 there is a single jumper assembly 232. It should be noted that the lengths of the optical fibers 200 could be of any appropriate length, depending on the installation and usage.

The second optical link 252 has two jumper assemblies 232 on either side of a trunk assembly 234. In this case, there are three inversions, one for each of the fiber optic assemblies.

The third optical link 254 has two jumper assemblies 232 on either side of a trunk assembly 234 and then an extender assembly 236 connected to the second jumper assembly 232. The first three fiber optic assemblies 230 have inversions (three is an odd number) and the extender assembly 236 is a pass-through.

Figure 6:
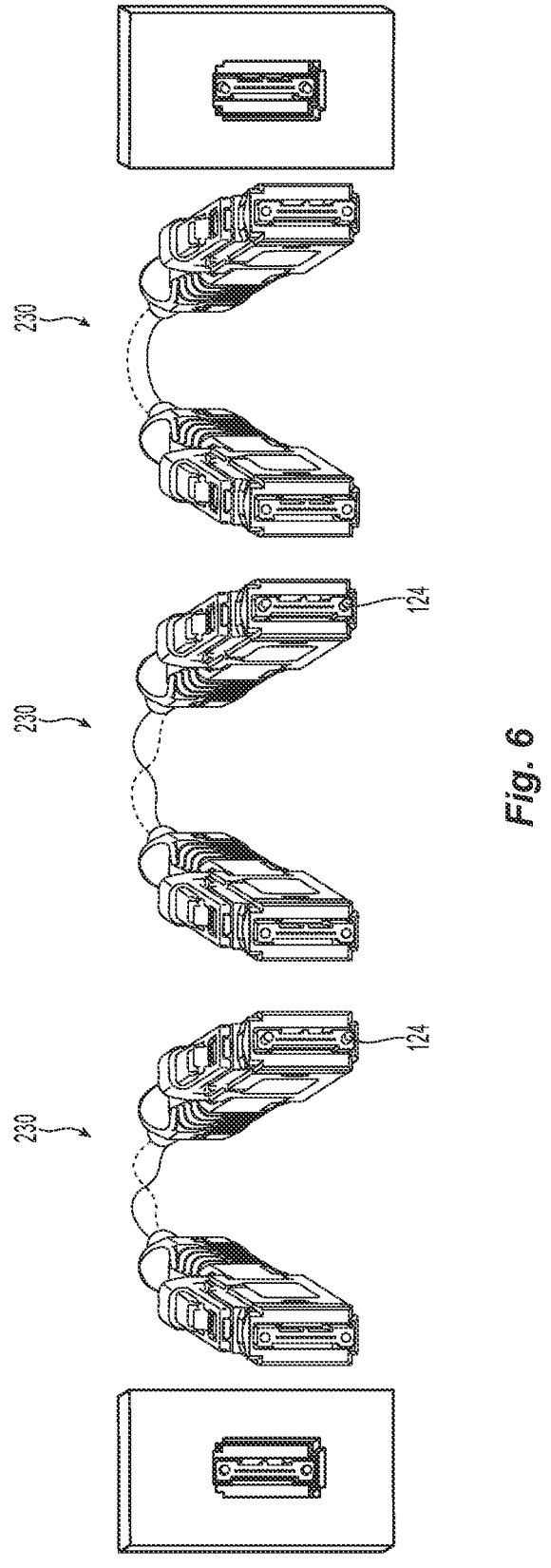
FIG. 6 illustrates a second embodiment of fiber optic assemblies that have different gender configuration than in the first embodiment.

A keen eye will note that the fiber optic assemblies 230 with the same gender configuration (all male or all female) of the fiber optic connectors also have the optical fibers inverted or flipped. The extender assembly 236, having different gender configurations, have a pass through with no flipping/inversion in the order of optical fibers between the individual connectors making up the extender assembly 236. Thus, as long as there are an odd number of those fiber optic assemblies 230 with the same gender, then the optical link will work. Alternatively, the fiber optic assemblies 230 with the different gender configurations of the fiber optic connectors could have the optical fibers inverted or flipped and the same gender fiber optic connectors could be the pass throughs. Again, as long as there is an odd number of inversions or flips, the optical link would work. This is illustrated in FIG. 6, where the first two fiber optic assemblies 230 have different gender fiber optic connectors (guide pins 124 are noted) and have the optical fibers inverted, while the last fiber optic assembly has the same gender connectors (female) and it does not have an inversion or flipping of the optical fibers 200. The connection setups described herein can be modified to have the fiber optic connector 222 in the transceivers 220 is chosen to be fixed as a female-type connector 204 (although this modification may not be preferable). In that setup, the positions of the jumper assembly 232 will be taken up by the trunk assembly(ies) 234 and vice-versa, to still have a guaranteed correct polarity configuration with only three types of fiber optic assemblies 230. In this alternative setup, the extender assembly 236 will still have the same configuration as above.

Due to the configuration of the three jumper types, the user is guaranteed to have an odd number of inversions by using the gender of the connector as a guide. For example, assuming the first transceiver is male, we know we need a female connector to plug in. We could select either the female end of an extender or a female jumper and plug into the first transceiver. Since we are assuming that all transceivers are the same, the second transceiver would also be male and we would need a female connector to end the link. If the user continues to use the gender of the mating connector as a guide, the user can take any combination of jumpers, trunks, and extenders and as long as the connectors pairs mate with one male and one female connector, there will always be an odd number of inversions in the link. Although the design shown allows the user to attempt to mate female and female connectors or male to male connectors, adapters could be designed to prevent mating of similar gender connectors, further preventing polarity concerns in the link.

Although the invention here focuses on a multi-fiber ferrule, the same convention could apply to duplex connectors with single fiber ferrules as well. Since single fiber ferrule connectors normally utilize 1.25 mm ceramic ferrules and do not utilize guide pins or gender, the connector would have a gender or type associated with it. For example, the connector could have a key that represented male or female type or the connector could have a "plug" type and a "jack" type. Fiber optic assemblies that have connector types on ends that are opposite one another would not have a fiber inversion, i.e., a plug-jack jumper. Fiber optic assemblies with the same type of connectors would have a fiber inversion, i.e., a plug-plug or a jack-jack assembly. Regardless of the type of fiber optic assembly, in duplex connector assemblies according to this embodiment, the individual single-fiber ferrules would be fixed relative to the rest of the connector (e.g., the housing 206). Instead of the gender (male/female) being used as a variable to assemble exactly three types of fiber optic assemblies in the aforementioned embodiments (i.e., jumpers, trunks, and extenders), the key associated with the individual connector and ferrules would classify the fiber optic assemblies as being one of the three types, namely, a plug-plug assembly, a jack-jack assembly, and a plug jack assembly, in this embodiment. Thus, even in the scenario when duplex connectors are used, the overall polarity decisions are significantly simplified by providing exactly three types of fiber optic assemblies, and by eliminating other variables in the optical link that affect polarity decisions in a conventional setup.

There also is an optical system that includes a first adapter communicatively associated with a first transceiver (e.g., the transceiver 220a), and a second adapter communicatively associated with a second transceiver (e.g., the transceiver 220b). The first and the second transceivers are optically coupled. The optical system includes a plurality of fiber optic assemblies, each of the plurality of optical fibers having opposing ends, the opposing ends being terminated by a first fiber optic connector and a second fiber optic connector, the fiber optic connectors having a gender of either male or female. When fiber optic assemblies have fiber optic connectors with the same gender, the plurality of optical fibers are not inverted and when the fiber optic assemblies have fiber optic connectors with an opposite gender, the plurality of optical fibers are inverted.

Figure 8:
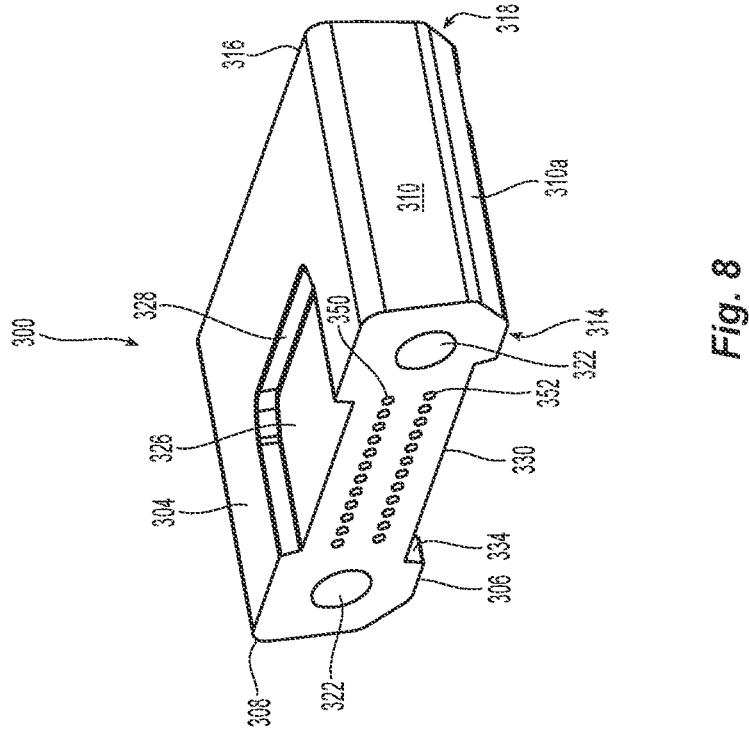
FIG. 8 is a perspective view of the multi-fiber ferrule with two rows of optical fibers in FIG. 7.
Figure 7:
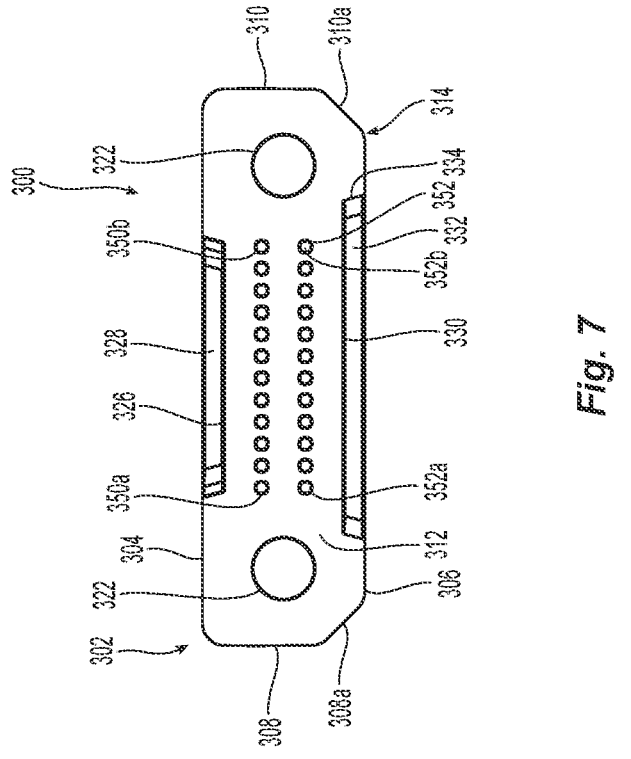
FIG. 7 is a front elevational view of a multi-fiber ferrule with two rows of optical fibers.

Another set optical links and their attendant components are illustrated in FIGS. 7-19. In these optical links, there are, as discussed above, fiber optic connectors with multi-fiber ferrules connecting two transceivers that are physically separated from one another. These multi-fiber ferrules 300 are similar to the multi-fiber ferrules 100 above, but they have slightly different dimensions and also two rows of multiple optical fibers. Illustrated in FIGS. 7 and 8 is one such multi-fiber ferrule 300 that can be used with the assemblies, connectors and optical links discussed below.

The multi-fiber ferrule 300 has a main body 302 having a top portion 304 and a bottom portion 306. There is a first side portion 308 that extends between the top portion 304 and the bottom portion 306. There is also a second side portion 310 extending between the top portion 304 and the bottom portion 306 on opposites sides of the main body 302. The main body 302 also has an end face 312 at a front end 314 of the main body 302 and a rear face 316 at a rear end 318 of the main body 302. See also FIGS. 12 and 13. The bottom corners 308a and 310a where the bottom portion 306 joins first side portion 308 and second side portion 310 are sloped and not rounded like at the top portion 304. This allows a user to quickly identify the top and the bottom of the multi-fiber ferrule 300, and also ensures the correct seating orientation of the multi-fiber ferrule 300 inside a housing of a fiber-optic connector. It also assists in identifying the position of the optical fibers. The multi-fiber ferrule 300 has two rows of optical fiber openings—a top row 350 and bottom row 352—at the end face 312. Each of the rows of optical fibers—the top row 350 and the bottom row 352—have 12 openings, although there may be more or fewer openings. Per convention in the industry, the opening 350a at the far left in the top row 350 (when looking at the end face 312 of the multi-fiber ferrule 300) is considered to be position 1 and the opening 350b on the far right of the top row 350 is position 12 (or 16 for some systems depending upon a number of fibers in the fiber ribbon). The lower row 352 has opening 352a at position 13 (or, 17 for some systems) on the far left and opening 352b at position 24 (or, 33 for some systems) is on the far right. One is able to quickly and accurately identify the optical fiber positions using the bottom corners 308a and 310a, as well as the cut-outs discussed below.

The multi-fiber ferrule 300 has a rear central opening 320 extending into the main body 302 from the rear face 316 and configured to receive multiple optical fibers 200. See also FIGS. 12 and 13. The optical fibers 200 may be single mode or multi-mode, and may be single core or multi-core, or combinations thereof. Further, this disclosure is not limited by the size or diameter of the optical fibers 200. The multi-fiber ferrule 300 also has a plurality of fiber support structures to support the optical fibers (not shown). The fiber support structures are in communication with the rear central opening 320 and extending through the main body 302 to the end face 312. Each of the top row 350 and the bottom row 352 thus has corresponding optical fiber support structures where the optical fibers are held (e.g., by curing epoxy). The main body 302 may also include two guide pin holes 322, which extend between the end face 312 and the rear face 316. The guide pin holes 322 provide a reference point with respect to the main body 302 and other structures to which the multi-fiber ferrule 300 is mated. The guide pin holes 322 are outside the area of cutouts 326,330 to allow for enough material in the main body 302 to allow for the guide pin holes 322. The end face 312 may have a trapezoidal profile (as shown), although a rectangular profile may also be provided as an alternative. There may be guide pins 324 (see FIG. 9) that are disposed within the guide pin holes 322.

The top portion 304 has a top cut-out 326 that form first forward facing surface 328. Similarly, the bottom portion 306 has the bottom cut-out 330 that forms a second forward facing surface 332. The second forward facing surface 332 is also used as a stop surface in conjunction with a housing for a connector. The bottom cut-out 330 also has two laterally facing surfaces 334 that form a portion thereof. The bottom cut-out 330 extends from the end face 312 towards the rear end 318, but does not reach the rear end 318. It may reach the same distance toward the rear end 318 from the end face 312 as does the top cut-out 326, but it may stop short of or beyond where the top cut-out 326 stops at forward facing surface 328. The cutouts 326,330 are dimensioned differently to allow for proper orientation of the mating multi-fiber ferrules 300, especially for angle-polished end faces 312.

The multi-fiber ferrule 300, which is produced by the Applicant and is marketed as the TMT ferrule, has dimensions of 1.9 mm height, 4.1 mm length between a front end and a rear end thereof, and a width of 6.4 mm between a first side portion and a second side portion. Thus, the TMT ferrule is substantially smaller than the conventional MT-type ferrules. The end face 312 is preferably angle-polished, i.e., at a non-perpendicular angle relative to the rear face 316, and/or relative to the direction of propagation of the optical beam inside the optical fibers 200 in the multi-fiber ferrule 300. The end face 312 is angled at about 8° to a direction of propagation of the optical beam inside the optical fiber 200 held by the multi-fiber ferrule 300. However, other ranges may be utilized, such as 5°-15° or 4°-10°. Alternatively, the end-face 312 may be flat polished (i.e., perpendicular to the rear face 316 and to the beam propagation direction). The top cut-out 326 may have a different width than the bottom cut-out 330. This may also act as a polarity indication and/or may cause the multi-fiber ferrule 300 to be oriented in a specific direction when received inside a receptacle or an adapter for mating with another ferrule. Alternatively, the top cut-out 126 may have a same width as the bottom cut-out 130.

Figures 9, 10, 11:
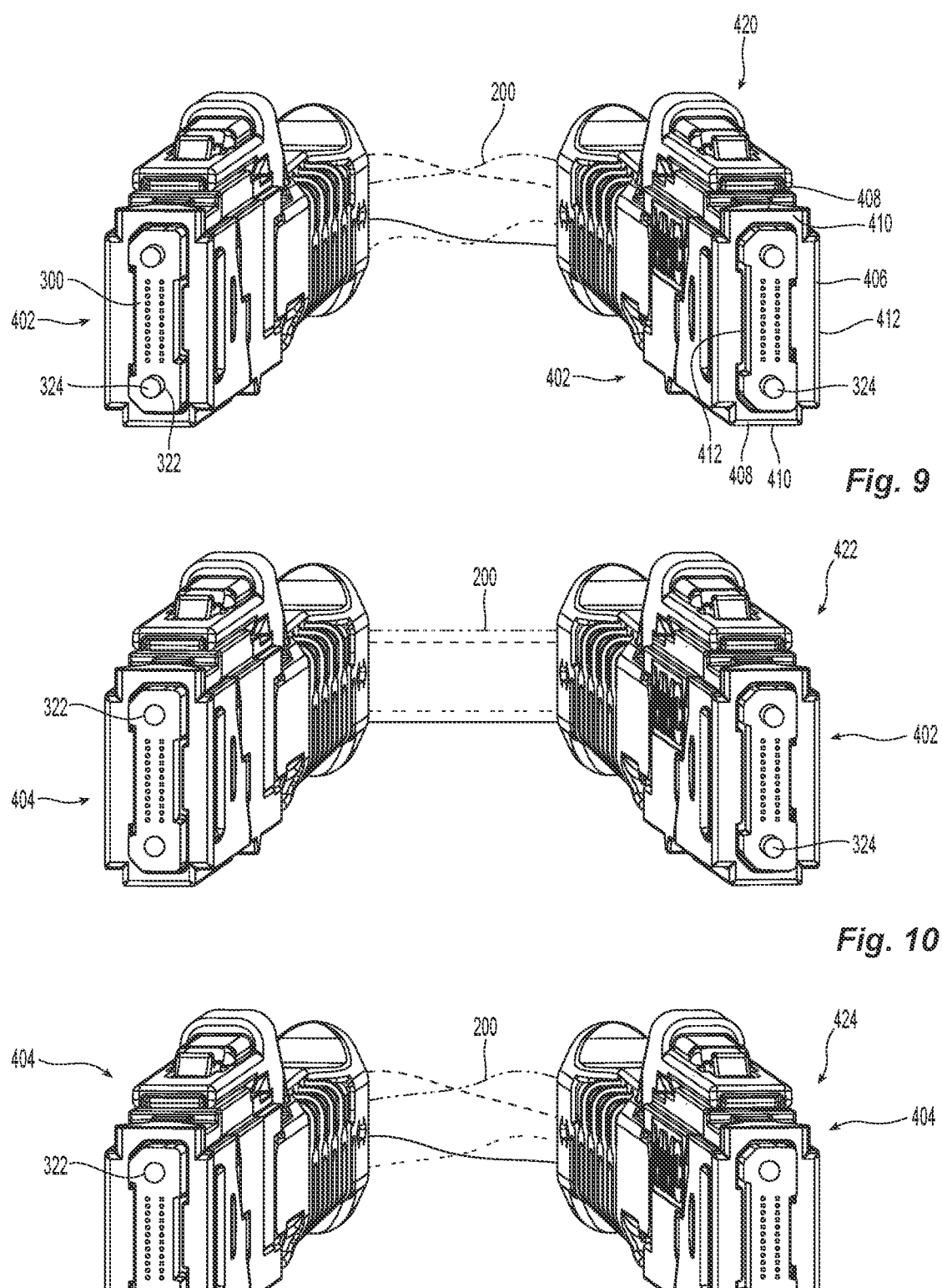
FIG. 9 is a perspective view of a male-to-male trunk assembly having male connectors on opposing ends of a plurality of optical fibers.
FIG. 10 is a perspective view of a male-to-female extender assembly having one male connector and one female connector on opposing ends of a plurality of optical fibers.
FIG. 11 is a perspective view of a female-to-female jumper assembly having two female connectors on opposing ends of a plurality of optical fibers.

Turning to FIGS. 9-11 are three configurations of connector assemblies that are used with the optical links of the present invention. In these configurations, there are two fiber optic connectors 402 and 404 that make up each of the connector assemblies and each include a multi-fiber ferrule 300. The fiber optic connector 402 has a fiber optic ferrule 300 with the guide pins 324 that are disposed within the guide pin holes 322. Thus, fiber optic connectors 402 each have a male configuration. Fiber optic connector 404 (see FIG. 10) does not have any guide pins and has a female configuration. Each of the fiber optic connectors 402 and 404 are optically connected to another of the fiber optic connectors 402/404 by being attached to ends of a plurality of optical fibers 200 terminated inside respective multi-fiber ferrules 300 that are held by the fiber optic connectors 402/404.

The three configurations are, in FIG. 9, a male-to-male trunk assembly 420 with two male fiber optic connectors 402 joined by a plurality of optical fibers 200 ("trunk assembly"). FIG. 10 has a male-to female extender assembly 422 with one male fiber optic connector 402 joined to one female fiber optic connector 404 with a plurality of optical fibers 200 ("extender assembly"). FIG. 11 has a female-to-female jumper assembly 424 with two female fiber optic connectors 404 joined by a plurality of optical fibers 200 ("jumper assembly"). As explained herein, correct polarity is ensured based on the gender of the fiber optic connectors 402, 404 using only these three types of connector assemblies having a two-row multi-fiber ferrule 300 in each such assembly.

The fiber optic connectors 402 and 404 are preferably the same and have the same components except for the guide pins 324. Thus, they will have an outer housing 406, which also has a key feature 408. The housing 406 has two short sides 410 and two long sides 412. The key feature 408 is preferably on one of the short sides 410, but could also be disposed on one of the long side 412. There are other internal components that are known to one of ordinary skill in the art and will not be discussed herein. However, one embodiment is discussed in PCT/US2021/028925 (published as WO 2021/217054, filed by the same applicant.

It should be noted that the multi-fiber ferrules 300 are installed in the outer housing 406 in the same orientation. The multi-fiber ferrules 300 may each protrude slightly from the front opening of the housing 406, as shown in FIG. 9, for example. This means that the optical fibers 200 in each fiber optic connector 402,404 always have the same orientation with respect to both the outer housing 406 and the multi-fiber ferrules 300. Thus, even rotating the outer housing 406 and the multi-fiber ferrules 300 keeps the fiber order the same as before rotation. As noted below, the only difference in the fiber optic connectors 402,404 is the presence or absence of the guide pins 324 and whether the optical fibers 200 are inverted (flipped) with respect to the multi-fiber ferrules 300. That is, the multi-fiber ferrule 300 has a fixed orientation relative to the outer housing 406 at all times regardless of the type of fiber optic assembly that it is a part of.

Figures 12, 13:
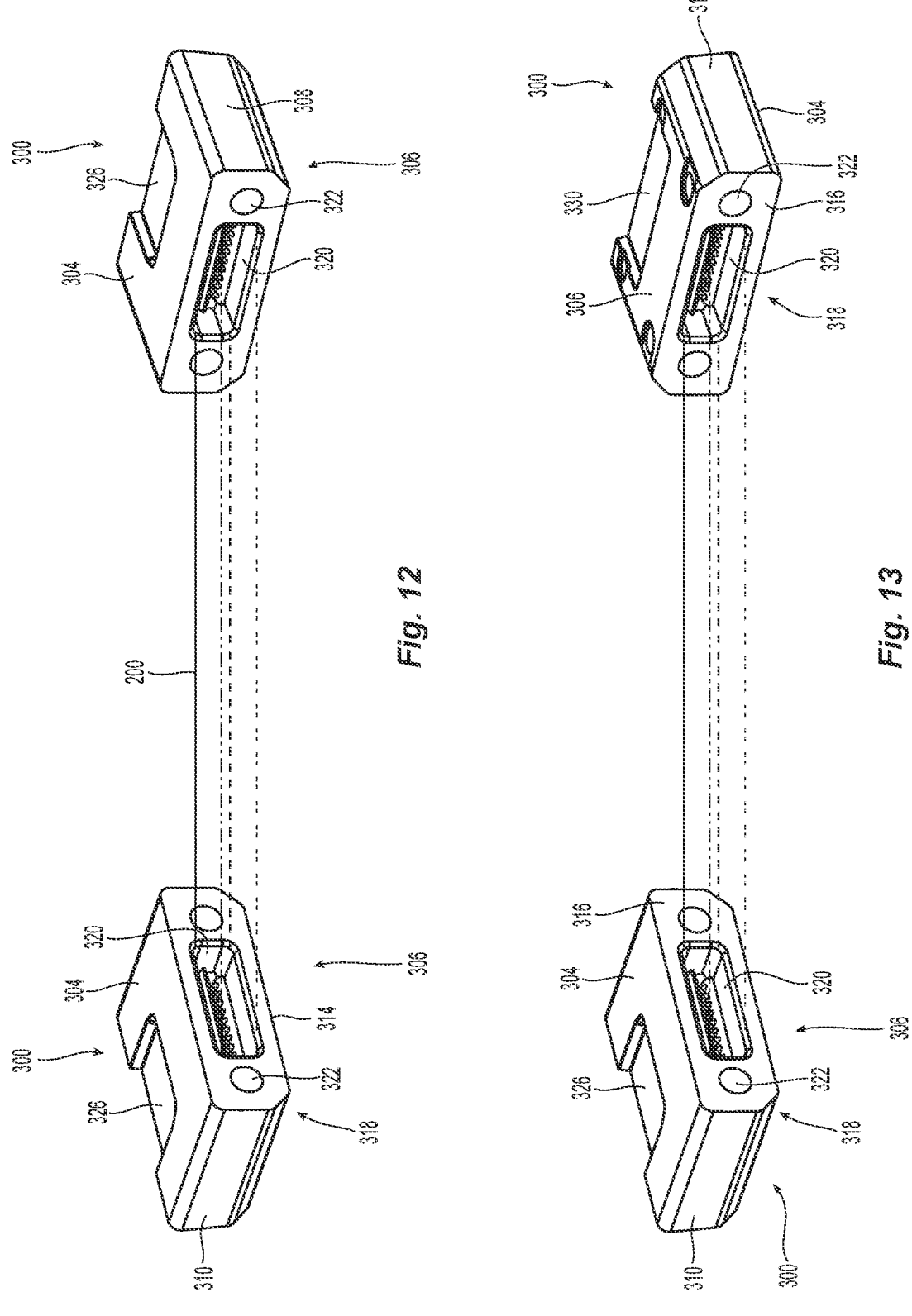
FIG. 12 is a perspective view of the multi-fiber ferrules used in the male-to-male trunk assembly as well as the female-to-female jumper assembly and the routing of the optical fibers therebetween.
FIG. 13 is a perspective view of the multi-fiber ferrules used in the male-to-female extender assembly and the routing of the optical fibers therebetween.

The installation of the optical fibers 200 into the multi-fiber ferrules 300 is described in conjunction with FIGS. 12 and 13. In FIG. 12, the multi-fiber ferrules 300 have been set on the bottom portions 306, with the rear faces 316 facing each other. The optical fibers 200 (only 4 optical fibers that are at the outermost positions in the fiber ribbon are illustrated but there are a total of 24 to be arranged) are then installed into the multi-fiber ferrules 300 without crossing over any of the optical fibers 200. FIG. 12 corresponds to the optical fibers between the two multi-fiber ferrules 300 of the trunk assembly 420 or the jumper assembly 424 (shown in FIGS. 9 and 11, respectively).

Since the multi-fiber ferrules 300 had the rear faces 316 facing each other, the optical fibers 200 are flipped since the optical fiber in position 1 on the right multi-fiber ferrule 300 is secured into position 12 on the left multi-fiber ferrule 300 and optical fiber in position 13 on the right multi-fiber ferrule 300 is secured into position 24 on the left multi-fiber ferrule 300. The remaining optical fibers 200 would be similarly secured: 2 to 11 and 14 to 23, etc. This arrangement of multi-fiber ferrules 300 and optical fibers 200 is done the same way for the male-to-male trunk assembly 420 and the female-to-female jumper assembly 424. The arrangement for the male-to female extender assembly 422 has one change from the other arrangements. As can be seen in FIG. 13, both of the multi-fiber ferrules 300 are not the bottom portions 306—the multi-fiber ferrule 300 on the right side is lying on the top portion 304 while only the left multi-fiber ferrule 300 is on the bottom portion 306. Thus, when the optical fibers 200 are routed directly across from one of the multi-fiber ferrules 300 to the other, the optical fibers 200 on the top left row (350) are secured in the bottom right row (352)—that is the optical fiber 200 in position 1 in the left multi-fiber ferrule 300 is then secured into position 13 on the right multi-fiber ferrule 300. Again this happens for all 24 of the optical fibers 200 in this arrangement and the effect is that the optical fibers 200 have changed rows in one of the multi-fiber ferrules 300. As a result, the optical fibers between the left side multi-fiber ferrule 300 are crossed-over to a different row of the right side multi-fiber ferrule 300 in view of the flipped orientation of the right multi-fiber ferrules 300 shown in FIG. 13. The phrase/term "crossed over" or "cross-over" as used herein refers to optical fibers from one row (e.g., top row 350) of one of the multi-fiber ferrules 300 being terminated at a different row (e.g., the bottom row 352) of the other multi-fiber ferrule 300 of the extender assembly 422.

Figure 14:
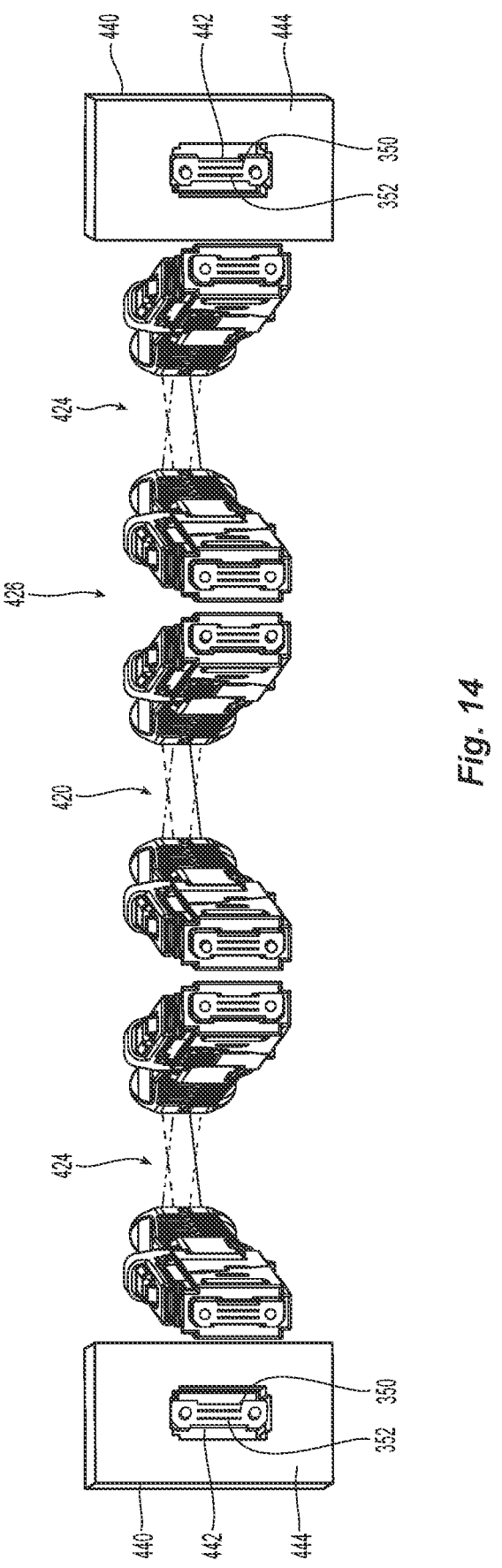
FIG. 14 illustrates three optical links and methods of connecting two transceivers that are operable, each having an odd number of fiber optic assemblies with inverted optical fibers using one male-to-male trunk assembly and two female-to-female jumper assemblies.
Figure 15:
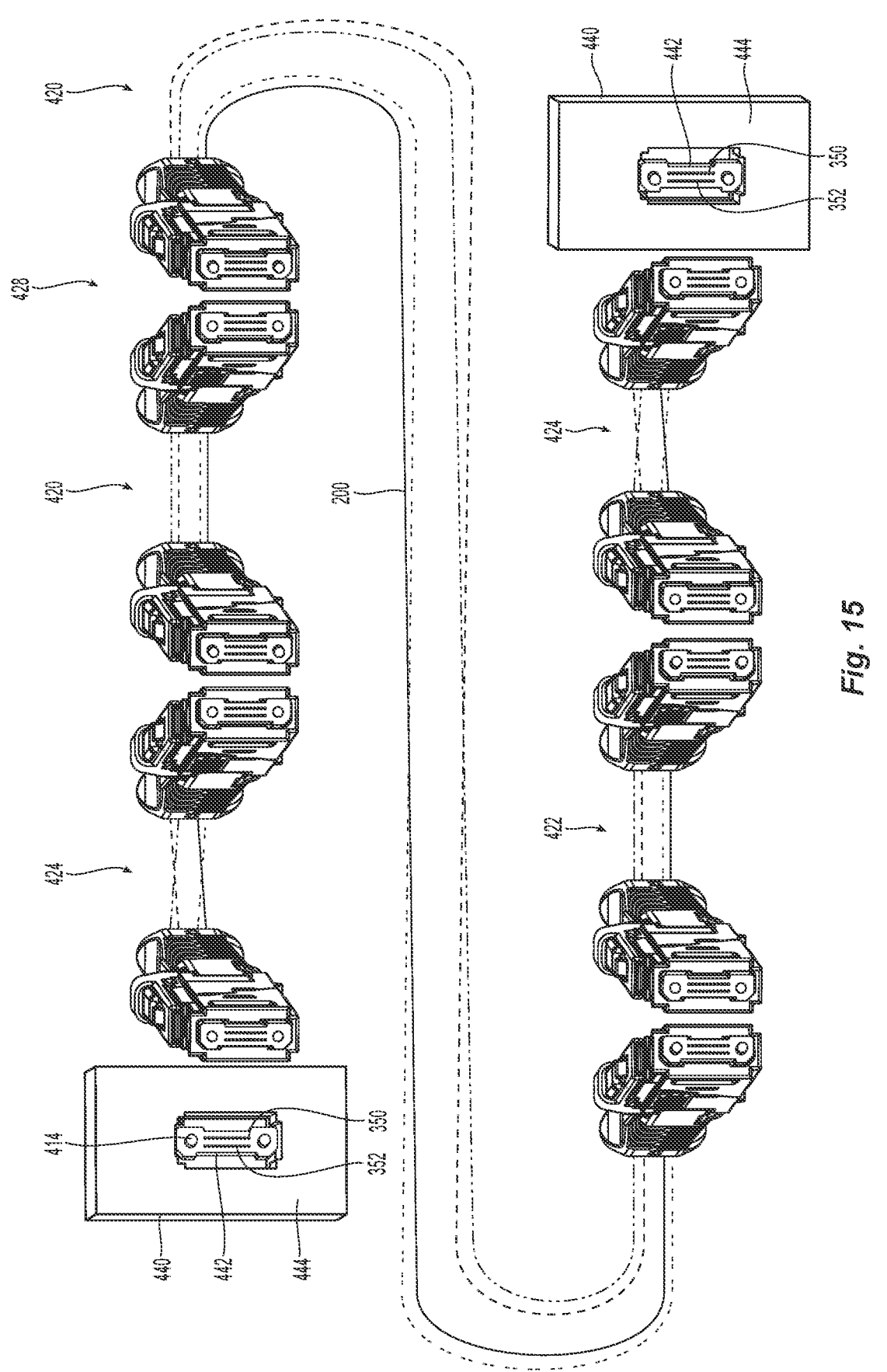
FIG. 15 illustrates five optical links and methods of connecting two transceivers that are operable, using one male-to-male trunk assembly, two female-to-female jumper assemblies, and two male-to-female extender assemblies.

In FIGS. 14 and 15, there are representations of a transceiver 440 with a fiber optic connector 442 and an adapter 444. The fiber optic connector 442 associated with the transceiver 440 is preferably configured to have the male configuration (with guide pins 414). This male configuration setup of the fiber optic connector 442 is fixed inside the adapter 444, thereby eliminating another variable affecting polarity decisions in an optical link. Further, with the guide pins 414 already installed in the two-row ferrule 300 of the fiber optic connector 442, there are fewer pin stubbing issues with the mating of the fiber optic connectors 402,404 with the fiber optic connector 442. In this respect, the transceiver 440 has a two-row multi-fiber ferrule 300, instead of a one row multi-fiber ferrule 100 shown, for example, in FIG. 3. The fiber optic connectors 402,404 are to be connected to other fiber optic connectors 402,404 and to the fiber optic connector 442 through the adapter 444 associated with the transceiver 440. In the present invention, it is preferred that the transceiver signals are in a fixed location with respect to the order of the optical fibers in the fiber optic connector 442. Generally, on the transmitter side, for the vertical orientation of the ferrule of the fiber optic connector 442 shown in FIGS. 14 and 15, the optical fibers 200 are towards a bottom side of the multi-fiber ferrules 300 in the fiber optic connector 442, e.g., fibers 1-6, and the receiver side fibers 200 are towards a top side of the multi-fiber ferrules 300, e.g., fibers 7-12 for a 12-fiber ferrule within, say, the top row 350. Similarly, fiber allocation is provided for the second row (say, the bottom row 352) of the multi-fiber ferrule 300 at the adapter 444 associated with the transceiver 440. Alternatively, the order may be reversed, i.e., on the transmitter side, the optical fibers 200 are towards a top side (for the vertical orientation of the ferrule of the fiber optic connector 442 shown in FIGS. 14 and 15) of the multi-fiber ferrules 300 in the fiber optic connector 442, e.g., fibers 1-6, and the receiver side fibers 200 are towards a bottom side of the multi-fiber ferrules 300, e.g., fibers 7-12 for a 12-fiber ferrule within, say, the top row 350. This matches up with the type of adapter 444 used for interfacing to the transceiver signals immediately as they exit or enter the transceiver 440 module. That is, the adapter 444 at the transceiver 440 is the same for all transceivers in the optical link. The adapter interface 444 is shaped to accept a corresponding outer connector housing 406 in a key-up to key-up manner only. This allows for the system to always have the same adapter configuration, just as the system has the same configuration of the multi-fiber ferrules 300 (except for the guide pins as noted above). Alternatively, the system could be altered to always be in a key-down to key-down configuration. Yet alternatively, the shape of the interface of the adapter 444 may be matched to alignment rails on the housing of the rails on the housing of the fiber optic connector 404 of the jumper assembly 424 or the extender assembly 422, or to a latch mechanism of the of the fiber optic connector 404, or to both.

Since the fiber optic connectors 442 in the transceiver 440 have guide pins (thereby being male) each of the fiber optic connectors 442 in the transceiver 440 need to first mate with a female fiber optic connector 404. Given the three options noted above, male-to-male trunk assembly 420, the female-to-female jumper assembly 424, and the male-to female extender assembly 422—the female-to-female jumper assembly 424, and the male-to female extender assembly 422 are the only possible options to mate with the fiber optic connectors 442. As illustrated in FIG. 14 for optical link 426, a female-to-female jumper assembly 424 is used on the left side to mate to the transceiver 440. With two female fiber optic connectors 404 on the jumper assembly 424, the next connector needs to be a male fiber optic connector to connector with a female fiber optic connector of the jumper assembly 424. As illustrated, the center assembly is a male-to-male trunk assembly 420. With the male fiber optic connector 402 open, the next assembly needs to have 2 female connectors (one for the male-to-male trunk assembly 420 and one for the transceiver 440 on the right. With all of the assemblies in the optical link 426 having flips or inversions and there being an odd number of assemblies, the send and receive signals from the transceivers 440 are correctly mapped.

Another example of an optical link 428 is illustrated in FIG. 15. In this figure there are five different assemblies. There are two of the female-to-female jumper assemblies 424 to mate with the fiber optic connectors 442 associated with each of the transceivers 440. Then there are two male-to female extender assemblies 422 that are separated by one male-to-male trunk assembly 420. Again, there are five assemblies and three have flips or inversions, keeping the polarity of the optical link 428. The extender assembly 422 offers an advantage because of the presence of a male and a female fiber optic connector (see again, FIG. 10). This allows for the capability of being used as a replacement to or in addition to the jumper assembly 424 or the trunk assembly 420 when a user is short on the latter two and can chose which type of connector to mate with (male or female) using the extender assembly 422. The female connector of the extender assembly 422 can also be directly mated to the male multi-fiber ferrule 300 at the adapter 444 associated with the transceiver 440. Thus, the end user only needs to possess or order three types of assemblies—shown in FIGS. 9-11—without worrying about the book-keeping issues of tracking which signal goes where ion the optical link. The unique gender arrangement controls and takes care of the book-keeping automatically.

Figure 16:
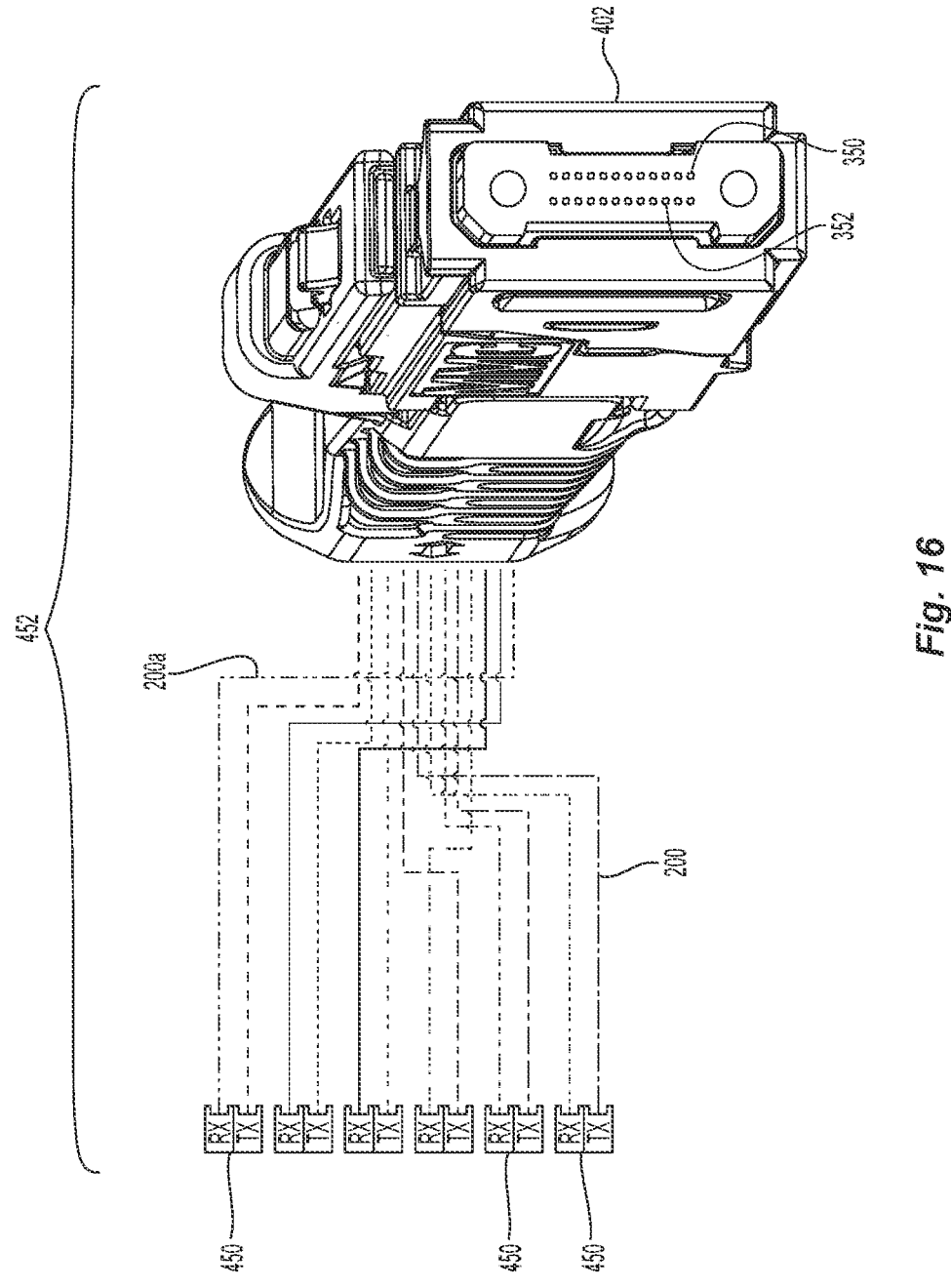
FIG. 16 illustrates a female multi-fiber connector with a multi-fiber ferrule that is broken out to fan-out assembly of multiple duplex connectors to connect with a transceiver.
Figure 17:
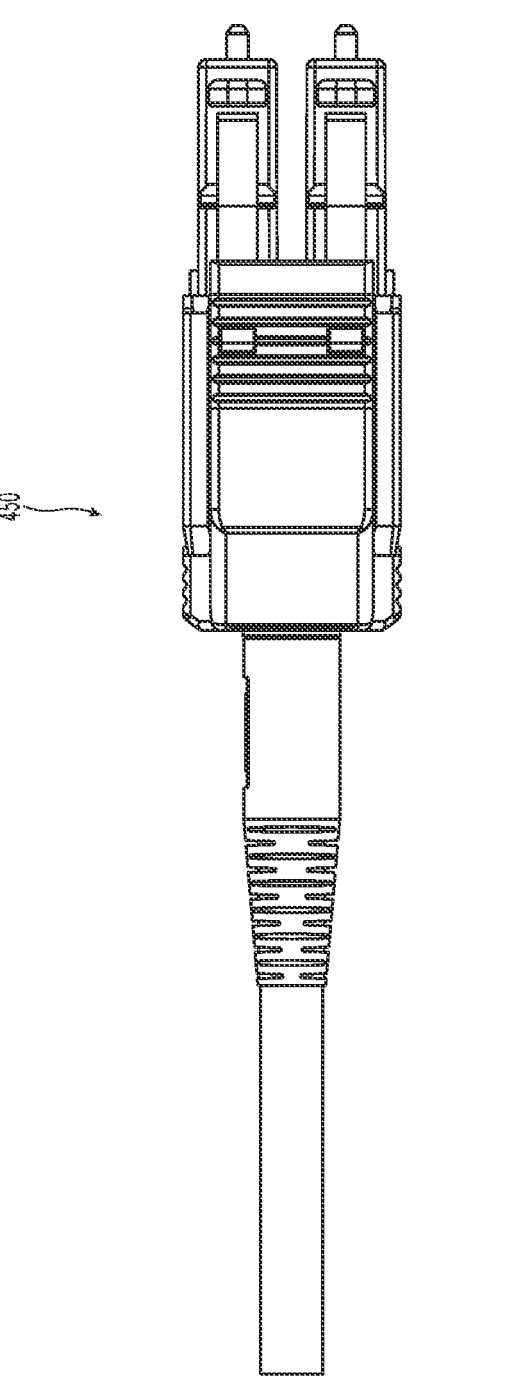
FIG. 17 illustrates one version of a duplex connector that can be used with the fan-out assembly of FIG. 16.

Turning now to FIGS. 16 and 17, the present invention also uses a fiber optic assembly that has one female multi-fiber connector 402 and at least one duplex fiber optic connector 450 joined together by optical fibers 200 and is referred to herein as a fan-out assembly (multi-fiber female-to-duplex fan-out assembly) 452. See the fiber optic assembly 452 in FIG. 16. As the term "fan-out" suggests, the fan-out assembly 452 fans out the optical fibers 200 in the multi-fiber connector 402 to multiple duplex connectors 450. By separating the optical fibers with a fan-out assembly 452, each duplex connector 450 can be coupled into a transceiver consisting of 2 optical fibers 200. The first optical fiber 200a in each grouping of optical fibers 200 is positioned in fiber hole position 12 in fiber optic connector 204. The optical fibers 200 in hole positions 12 and 1 are paired together in the first duplex connector 450 at the opposite end of the fan-out assembly 452. The optical fiber from position 12 terminates in position A of duplex fiber optic connector 450, the optical fiber from position 1 terminates in position B of duplex fiber optic connector 450. Following, the optical fibers in hole positions 11 and 2 are paired together in the second duplex fiber optic connector 450, and so forth. The same pattern is repeated with the grouping of optical fibers (not shown) in row 2 of fiber optic connector 402.

Figure 18:
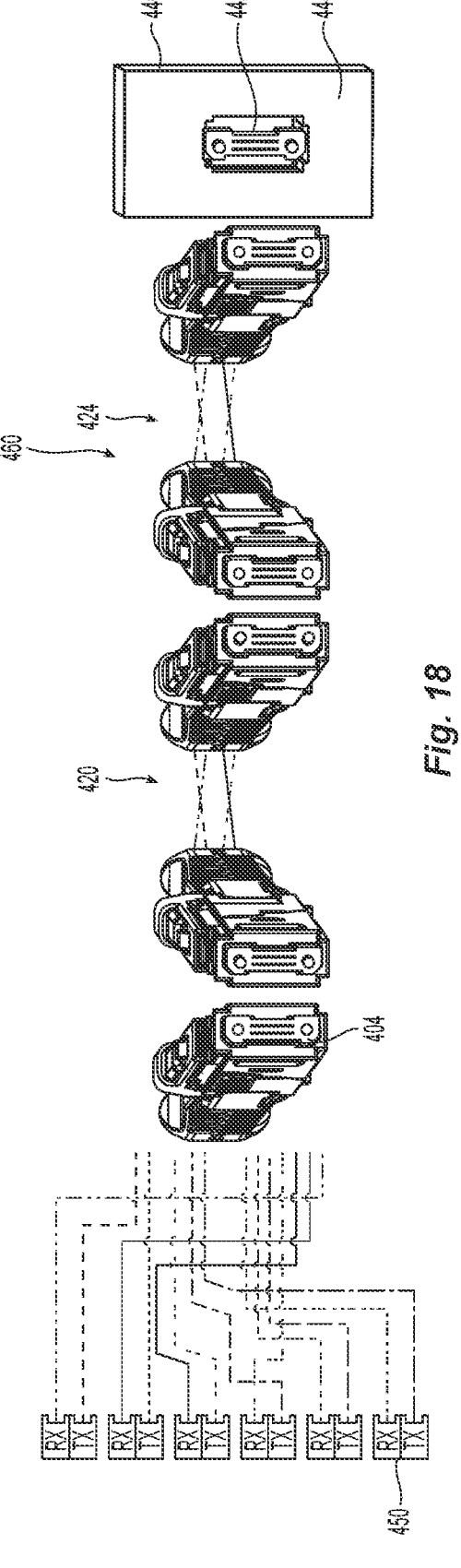
FIG. 18 illustrates two optical links and methods of connecting two transceivers that are operable, using one male-to-male trunk assembly and one female-to-female jumper assembly; and one female connector linked to a fan-out assembly of multiple duplex connectors.
Figure 19:
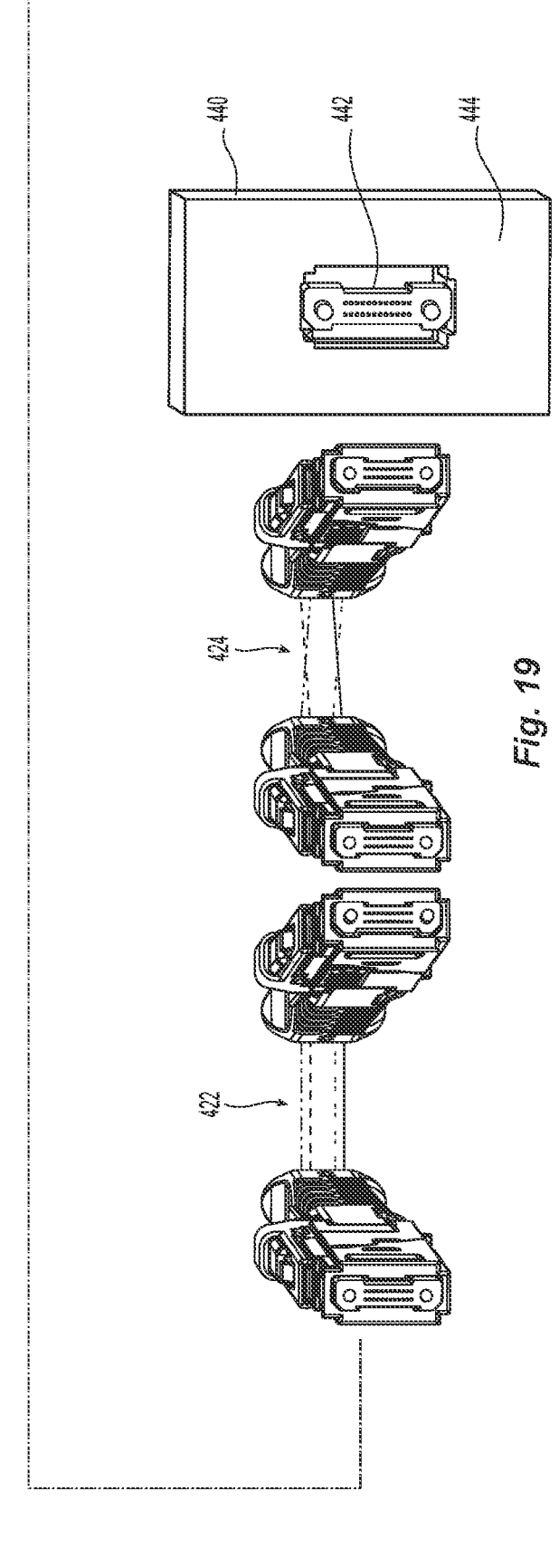
FIG. 19 illustrates five optical links and methods of connecting two transceivers that are operable, using one male-to-male trunk assembly, one female-to-female jumper assembly, and two male-to-female extender assemblies, and one female connector linked to a fan-out assembly of multiple duplex connectors.

FIGS. 18 and 19 show two different optical links using the fan-out assembly 452. In FIG. 18, the optical link 460 the transceiver 440 is on the right and connects to a female-to-female jumper assembly 424 as with other optical links above. Then there is a male-to-male trunk assembly 420 to join with the female multi-fiber connector 404. Finally, there is a fan-out assembly 452 with a female multi-fiber connector 404 to connect with the transceiver 440 through duplex connectors 450. It should be noted that there are two flips in with the female-to-female jumper assembly 424 and the male-to-male trunk assembly 420. However, the fan-out assembly 452 also has a flip, so there are three flips or inversions and the optical link 460

Finally, in FIG. 19 there is another optical link 462 using the fan-out assembly 452. In the optical link 462, there is one female-to-female jumper assembly 424 to connect to the transceiver 440 on the right side and then two male-to female extender assemblies 422, which are separated by a male-to-male trunk assembly 420.

Lastly, there is a fan-out assembly 452 with a female multi-fiber connector 404 to connect with the transceiver 440 through duplex connectors 450. There are three flips or inversions one with female-to-female jumper assembly 424 and one with the male-to-male trunk assembly 420, and a third with the fan-out assembly 452.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A method for ensuring correct polarity in an optical link having a first transceiver and a second transceiver separated from one another, comprising:

providing a first multi-fiber ferrule with two rows of optical fibers and guide pins and supporting the optical fibers carrying optical signals passing through the first transceiver and a second multi-fiber ferrule with two rows of optical fibers and with guide pins and supporting the optical fibers carrying optical signals passing through the second transceiver; and providing at least one female-to-female jumper assembly having two female connectors couplable respectively to the first multi-fiber ferrule associated with the first transceiver and the second multi-fiber ferrule associated with the second transceiver, the at least one female-to-female jumper assembly having a first plurality of optical fibers extending between the two female connectors, wherein said at least one female-to-female jumper assembly includes an inversion in an order of the first plurality of optical fibers connecting the two female connectors, and wherein when the optical link further includes using at least one male-to-female extender assembly having a male connector on a first end of the at least one male-to-female extender assembly and a female connector on a second end of the at least one male-to-female extender assembly between said first and second transceivers, the male connector and the female connector of the at least one male-to-female extender assembly joined to each other by a second plurality of optical fibers, a first group of optical fibers in the second plurality of optical fibers and supported in a first row of a multi-fiber ferrule in the male connector cross-over to a second row of a multi-fiber ferrule in the female connector, and a second group of optical fibers in the second plurality of optical fibers and supported in a second row of the multi-fiber ferrule of the male connector cross-over to a first row of the multi-fiber ferrule of the female connector such that between the male connector and the female connector, each of the two rows are switched to the other of the two rows in the male-to-female extender assembly, and a number of inversions of optical fibers between the first transceiver and the second transceiver is an odd number.

2. The method according to claim 1, wherein the optical link further comprises a trunk assembly having two male connectors, one of the two male connectors on opposing ends of a plurality of optical fibers mating with one of the two female connectors of the female-to-female jumper and includes an inversion in an order of the plurality of optical fibers connecting the two female connectors of the at least one male-to-female extender assembly.

3. The method according to claim 1, further comprising:
providing a first adapter associated with the first trans-ceiver;
providing a second adapter associated with the second transceiver; and
providing a first key on the first adapter and a second key on the second adapter, the first key and the second key aligned to a key on one of the two female connectors of the at least one female-to-female jumper assembly that directly mates in the adapter.

4. The method according to claim 3, wherein the key on one of the two female connectors is on a short side of the connector.

5. The method according to claim 1, wherein the optical link further includes at least one male-to-male trunk assembly, the at least one male-to-male trunk assembly does not mate directly with either the first multi-fiber ferrule or the second multi-fiber ferrule.

6. The method according to claim 1, further comprising providing an additional male-to-female extender assembly having exactly one male connector and one female connec-tor, the one female connector of the additional male-to-female extender assembly being coupled to at least one of the first multi-fiber ferrule of the first transceiver and the second multi-fiber ferrule of the second transceiver, or
the one male connector of the additional male-to-female extender assembly being coupled to one of the two female connectors of the at least one female-to-female jumper assembly.

7. The method according to claim 1, wherein the first and the second multi-fiber ferrules have a non-perpendicular angled end face relative to a direction of optical beam propagation inside the first and the second multi-fiber fer-rule, and wherein each ferrule of the at least one female-to-female jumper assembly and the male-to-female extender assembly also has an angled end face relative to a respective direction of respective optical beam propagation therein.

8. The method according to claim 1, wherein between the first transceiver and the second transceiver, any two mating multi-fiber ferrules have end faces that are mated in oppos-ing end face orientations.

9. A method for ensuring correct polarity in an optical link having a first transceiver and a second transceiver, compris-ing:
providing a first multi-fiber ferrule with two rows of optical fibers, guide pins, and supporting optical fibers carrying optical signals passing through the first trans-ceiver, and a second multi-fiber ferrule with two rows of optical fibers, guide pins, and supporting optical fibers carrying optical signals passing through the sec-ond transceiver; and
providing only three configurations of connector assem-blies to maintain correct routing of optical signals between the first transceiver and the second transceiver, the three configurations of connector assemblies including: a jumper assembly having two female con-nectors on opposing ends of a first plurality of optical fibers, a trunk assembly having two male connectors on opposing ends of a second plurality of optical fibers, and an extender assembly having exactly one male connector and one female connector on opposing ends of a third plurality of optical fibers,
wherein routing of the optical signals is carried out using at least one jumper assembly couplable to the first multi-fiber ferrule of the first transceiver and the second multi-fiber ferrule of the second transceiver, the at least one jumper assembly including an inversion in an order of the first plurality of optical fibers for each row of the first plurality of optical fibers connected between the two female connectors of the at least one jumper assembly,
wherein when the optical link includes at least one extender assembly, the optical fibers in a first row of a third multi-fiber ferrule in the male connector cross-over to a second row of a fourth multi-fiber ferrule in the female connector, and the optical fibers of a second row of the third multi-fiber ferrule of the male connec-tor cross-over to a first row of the fourth multi-fiber ferrule of the female connector such that each of the two rows are switched to the other of the two rows in the extender assembly and wherein a total number of inversions in the first, second and third plurality of optical fibers between the first transceiver and the second transceiver is odd; and
wherein when the extender assembly is used in addition to the jumper assembly and/or the trunk assembly.

10. The method according to claim 9, further comprising:
providing a first adapter associated with the first trans-ceiver;
providing a second adapter associated with the second transceiver; and a first key on the first adapter and a second key on the second adapter, the first key and the second key aligned to a key on one of the two female connectors of the at least one jumper assembly that directly mates in the adapter.

11. The method according to claim 9, wherein the optical link includes the at least one jumper assembly and at least one extender assembly, the at least one extender assembly does not mate directly with either the first multi-fiber ferrule or the second multi-fiber ferrule.

12. The method according to claim 9, further comprising providing an extender assembly having exactly one male connector and one female connector, the extender assembly being coupled to at least one of the first ferrule or the second ferrule.

13. The method according to claim 9, wherein the first multi-fiber ferrule, the second multi-fiber ferrule, the third multi-fiber ferrule and the fourth multi-fiber ferrule all have non-perpendicular angled end face relative to a direction of mating or to a direction of optical beam propagation.

14. An optical system, comprising:
a first adapter communicatively associated with a first transceiver;

a second adapter communicatively associated with a second transceiver, the first transceiver and the second transceiver being physically separated and optically coupled;

a first multi-fiber ferrule with guide pins and two rows of optical fibers inside the first adapter, the optical fibers carrying optical signals passing through the first transceiver;

a second multi-fiber ferrule with guide pins and two rows of optical fibers inside the second adapter and carrying optical signals passing through the second transceiver; and at least one female-to-female jumper assembly having two female connectors and each of the two female connectors having respective multi-fiber ferrules capable of holding two rows of optical fibers, one of the two female connectors positioned at opposing ends of a plurality of optical fibers, a first of the two female connectors coupling to a first multi-fiber ferrule thereof, and a second of the two female connectors coupling to a second multi-fiber ferrule thereof, wherein said at least one female-to-female jumper assembly includes an inversion in an order of each row of optical fibers connecting the two female connectors, wherein the first transceiver and the second transceiver and the at least one female-to-female jumper assembly form an optical link, and wherein when the optical link further includes at least one male-to-female extender assembly having a male connector on a first end of the at least one male-to-female extender assembly and a female connector on a second end of the at least one male-to-female extender assembly between said first and second transceivers, optical fibers in a first row of a multi-fiber ferrule in the male connector cross-over to a second row of a multi-fiber ferrule in the female connector, and the optical fibers of a second row of the multi-fiber ferrule of the male connector cross-over to a first row of the multi-fiber ferrule of the female connector such that each of the two rows are switched to the other of the two rows in the at least one male-to-female extender assembly, and a total number of inversions of optical fibers between the first adapter and the second adapter is odd.

15. An optical system comprising:

a first adapter communicatively associated with a first transceiver;

a second adapter communicatively associated with a second transceiver, the first and the second transceivers being optically coupled; and a plurality of fiber optic assemblies having a respective plurality of optical fibers, each of the plurality of optical fibers having opposing ends, the opposing ends being terminated by a first fiber optic connector and a second fiber optic connector and each of the fiber optic connectors have a two row multi-fiber ferrule disposed therein, the fiber optic connectors having a gender of either male or female, and wherein when fiber optic connectors assemblies have fiber optic connectors with the same gender, the plurality of optical fibers are inverted between respective two-row multi-fiber ferrules of the fiber optic connectors and when the fiber optic connectors assemblies have fiber optic connectors with opposite genders, the optical fibers in a first row of the multi-fiber ferrule in a male connector cross-over to a second row of a multi-fiber ferrule in a female connector, and the optical fibers of a second row of the multi-fiber ferrule of the male connector cross-over to a first row of the multi-fiber ferrule of the female connector such that each of the two rows are switched to the other of the two rows in the fiber optic assemblies having fiber optic connectors with the opposite genders.

16. The optical system of claim 15, wherein the two row multi-fiber ferrule in each of the fiber optic connectors has dimensions of 1.9 mm height, 4.1 mm length between a front end and a rear end thereof, and a width of 6.4 mm between a first side portion and a second side portion thereof.

17. The optical system of claim 16, wherein the two row multifiber ferrule in each of the fiber optic connectors is a TMT ferrule.

* * * * *